(12) United States Patent
Nishijima et al.

(10) Patent No.: US 6,994,664 B2
(45) Date of Patent: Feb. 7, 2006

(54) METHOD FOR FOLDING UP AN AIR BAG

(75) Inventors: Kazuyoshi Nishijima, Fuji (JP); Tetsuji Endo, Fuji (JP); Kazuhiro Kaneko, Fuji (JP); Toshiyuki Sugiyama, Fuji (JP); Mikio Ochiai, Fuji (JP); Yoshinori Goto, Fuji (JP); Masaki Ueno, Fuji (JP); Masahito Ishizuka, Fuji (JP)

(73) Assignee: Nihon Plast Co., Ltd., Shizuoka (JP)

( * ) Notice: Subject to any disclaimer, the term of this patent is extended or adjusted under 35 U.S.C. 154(b) by 8 days.

(21) Appl. No.: 10/257,416

(22) PCT Filed: Apr. 11, 2001

(86) PCT No.: PCT/JP01/03119

§ 371 (c)(1),
(2), (4) Date: Feb. 10, 2003

(87) PCT Pub. No.: WO01/76917

PCT Pub. Date: Oct. 18, 2001

(65) Prior Publication Data

US 2003/0171200 A1 Sep. 11, 2003

(51) Int. Cl.
*B31F 1/00* (2006.01)

(52) U.S. Cl. .................. 493/449; 493/457; 493/454; 280/728.1

(58) Field of Classification Search ............ 493/449, 493/457, 405, 454, 940, 458; 280/728.1, 280/743.1
See application file for complete search history.

(56) References Cited

U.S. PATENT DOCUMENTS

| | | | | |
|---|---|---|---|---|
| 5,795,284 A | | 8/1998 | Berti | ............ 493/405 |
| 6,149,568 A | * | 11/2000 | Ross et al. | ............ 493/458 |
| 6,152,867 A | | 11/2000 | Heudorfer | ............ 493/451 |
| 6,224,100 B1 | * | 5/2001 | Kamano et al. | ......... 280/743.1 |
| 6,250,675 B1 | * | 6/2001 | Dietsch et al. | ........... 280/743.1 |

FOREIGN PATENT DOCUMENTS

| | | |
|---|---|---|
| CN | 1129649 A | 8/1996 |
| CN | 1181326 A | 5/1998 |
| DE | 44 40 845 A1 | 5/1996 |
| DE | 19702147 A1 | 4/1998 |
| DE | 19748499 A1 | 5/1999 |
| EP | 0 712 760 A1 | 5/1996 |
| EP | 0839691 A1 | 5/1998 |
| EP | 0913298 A2 | 5/1999 |
| EP | 1145920 A2 | 10/2001 |
| ES | 2 087 843 | 5/1996 |
| ES | 2117613 | 5/1998 |
| JP | 08-207682 | 8/1996 |
| JP | 10-129381 | 5/1998 |
| JP | 11-152003 | 6/1999 |
| JP | 11-192909 | 7/1999 |
| JP | 11-334511 | 12/1999 |
| JP | 11-334512 | 12/1999 |
| JP | 2000-095050 | 4/2000 |
| WO | 9748580 | 12/1997 |

* cited by examiner

*Primary Examiner*—Sameh H. Tawfik
(74) *Attorney, Agent, or Firm*—Darby & Darby

(57) ABSTRACT

An air bag is unfolded on a planar surface and is inflated with air. The air bag is loosely sandwiched between the upper and lower blades that are arranged in a radial configuration. Movable blocks progress toward the center to fold the upper and lower panels of the air bag against the central part of the air bag. The resulting central folded part of the air bag has a wave-like configuration, and the upper and lower panels are separated from each other. The ear-like portions of the air bag are wound around the central folded part of the air bag that is folded in a wave-like configuration. Then, the central part of the air bag is pressed downward to complete the folding process. Gas can be supplied smoothly from the inlet port to the periphery when the air bag is reinflated. The method for folding the air bag is simple, and the air bag can be inflated quickly.

7 Claims, 18 Drawing Sheets

(a)

(b)

(a)

(b)

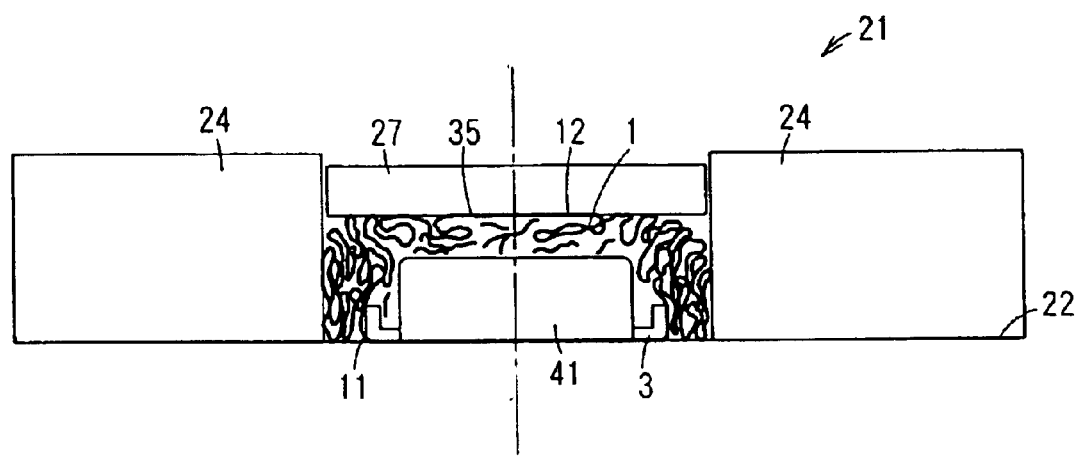
F I G. 2 6
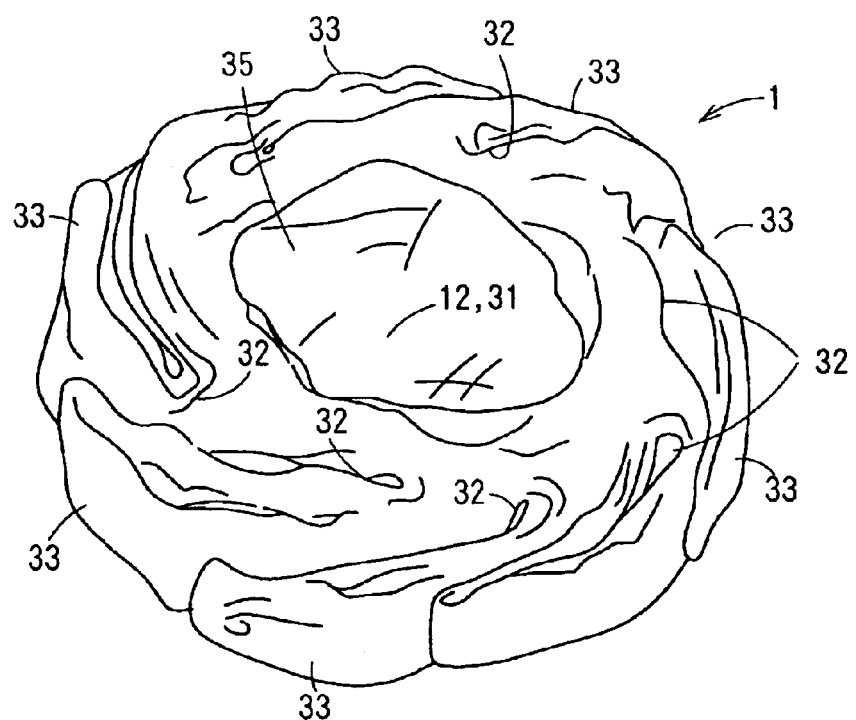
F I G. 2 7

METHOD FOR FOLDING UP AN AIR BAG

This is a U.S. national phase application under 35 U.S.C. §371 of International Patent Application No. PCT/JP01/03119, filed Apr. 11, 2001, and claims benefit of Japanese Patent Application Nos. 2001-109606, filed Apr. 11, 2000 and Japanese Application No. 2000-264052, filed Aug. 31, 2000. The International Application was published in Japanese on Oct. 18, 2001 as WO 01/76917 A1 under PCT Article 21(2).

FIELD OF THE INVENTION

The present invention relates to a method for folding an air bag that has been inflated, for example, with gas; a device for folding an air bag; and an air bag.

BACKGROUND OF THE INVENTION

A conventional air bag device is provided on a steering wheel of an automobile. This air bag device comprises an air bag having a flat bag-like configuration, a cover body for covering the air bag, and an inflator for injecting gas. The air bag is folded into a small size and is housed in the inside of the cover body by a predetermined method. The air bag device injects gas from the inflator when the sensor detects an impact of a collision in order to inflate the air bag. The cover body must be broken with the inflation pressure of the air bag, allowing the air bag to be inflated and deployed toward the driver to minimize the force of impact on the driver.

The conventional air bag is folded from the unfolded, plate-like configuration along straight lines at predetermined positions into a rectangular configuration which can be housed in the cover body. However, considerable manpower is required since it is difficult to mechanize the folding device. Therefore, it is also difficult to improve productivity.

Japanese Patent Application No. 2000-502637 discloses a device for folding an air bag that may be automated. This folding device comprises folding plates that are arranged in concentric circles or in a spiral configuration and are located opposite to the upper and lower parts of the air bag. The air bag device is inflated while it is sandwiched by the folding plates. Each of the folding plates, which are arranged in concentric circles, are moved or deformed to decrease the diameter of the concentric circles in order to fold the air bag. However, the folding device is complicated and is costly to use.

Furthermore, an air bag that is circular as seen from a planar perspective is subject to petal folding in which the air bag is gathered toward its center from its outer circumference and takes on a pleat-like configuration. Other structures are disclosed in Japanese Unexamined Patent Publication No. HEI 10-129381 and Japanese Unexamined Patent Publication No. HEI 10-217894.

The present invention provides a method for folding an air bag that provides desired folding characteristics and can decrease manufacturing costs, an air bag device, and an air bag.

SUMMARY OF THE INVENTION

The present invention provides a method for folding an air bag having a lower panel that has a surface on one side having an inlet port into which gas is introduced and an upper panel that has a surface on an other side located opposite to the lower panel. The method comprises a holding and inflating step, a storing step, and a pressing step.

In the holding and inflating step, the size of the air bag is adjusted so that the lower panel and the upper panel are close to each other along lines at predetermined positions while the air bag is inflated so that the portions of the upper panel between the lines expand, thereby separating the portions of the upper and lower panels between the lines.

In the storing step, the portions of the upper and the lower panels between the lines are pushed toward the inlet port and folded into a folded part.

In the pressing step, the portions of the upper and the lower panels on the lines are pushed against the outer circumference of the folded part.

In the method described above, the air bag is held so that the portions of the upper panel and the lower panel are close to each other on the lines directed toward the inlet port at predetermined positions whereas the portions of the upper panel and the lower panel between the lines are not held and are separated from each other. The portions of the upper panel and the lower panel between the lines are pushed toward the inlet port and are folded so that the portions of the upper panel and the lower panel are not touching each other, and each panel is folded in a wave-like configuration to collectively form a folded part. The portions of the upper and the lower panels on the lines are pushed against the outer circumference of the folded part. Therefore, the gas introduced from the inlet port is supplied effectively to a peripheral part of the air bag, so that the air bag inflates efficiently. Furthermore, since the height of the entire surface of the air bag is not held in place when the air bag is folded, a large component typically found in conventional folding devices for holding the entire surface in place is not required. Therefore, the air bag may be folded quickly with a device having a simple structure, and manufacturing costs are decreased.

The holding and inflating step can comprise separate holding and inflating steps. In the holding step, the portions of the upper panel and the lower panel on the lines directed toward the inlet port are close to each other. In the inflating step that follows the holding step, the portions of the upper panel and the lower panel between the lines are separated. When the holding step is performed before the inflating step, the force applied to the air bag that is required during the holding and inflating step is not necessary. When the inflating step is performed before the holding step, the inner pressure of the air bag can be increased so that the portion of the lower panel between the lines is separated quickly, and substantially from the portion of the upper panel between the lines.

The method for folding the air bag can comprise a holding, supporting, and lifting step, a storing step, and a pressing step.

In the holding, supporting, and lifting step, the air bag is held so that the portions of the upper panel and lower panel on the lines directed toward the inlet port are close to each other. A portion of the upper panel located opposite to the inlet port is supported, and a portion of the upper panel is lifted thereby partially separating the portion of the lower panel from the portion on the upper panel.

In the storing step, the portions of the upper and the lower panels between the lines are pushed toward the inlet port and folded into a folded part.

In the pressing step, the portions of the upper and the lower panels on the lines are pushed against the outer circumference of the folded part.

In the method described above, the air bag is held so that the portions of the upper panel and the lower panel are close to each other on the lines directed toward the inlet port at predetermined positions whereas the portions of the upper panel and the lower panel between the lines are not held in place and are partially separated from each other. The portions of the upper panel and the lower panel between the lines are pushed toward the inlet port and are folded so that the portions of the upper panel and the lower panel are not engaged with each other, and each panel is folded in a wave-like configuration to collectively form a folded part. The portions of the upper and the lower panels on the lines are pushed against the outer circumference of the folded part. Therefore, the gas introduced from the inlet port is supplied effectively to a peripheral part of the air bag, so that the air bag inflates efficiently. Furthermore, since the height of the entire surface of the air bag is not held in place when the air bag is folded, a large component typically found in conventional folding devices for holding the entire surface in place is not required.

The method for folding the air bag can comprise a shifting step. In the shifting step, the air bag can be reshaped into the desired configuration. The upper panel is moved closer to the lower panel so that the folded air bag can be accommodated more easily. A portion of the upper panel that is moved overlaps without engaging the portion that is folded during the storing step and pressing step. Therefore, the air bag can inflate quickly and immediately after the inflow of the gas.

The method for folding the air bag can comprise a hold alleviating step which occurs after the storing step and before the completion of the pressing step. In the hold alleviating step, the portions of the upper panel and the lower panel on the lines are no longer positioned close to each other. Therefore, the air bag can be folded efficiently.

The upper and the lower panels of the air bag are approximately circular, and the inlet port is arranged approximately at the center of the lower panel. Therefore, the structure of the air bag is appropriate for the steering wheel of an automobile.

The method for folding the air bag can comprise a storing step wherein the exhaust of the gas inside the air bag is regulated in order to ensure a slight amount of gas inside the air bag. A slight amount of gas is required for folding the air bag. As compared with the structure in which the air bag is inflated, less time is required to supply the gas to and exhaust the gas from the air bag. Therefore, components may be omitted or simplified in order to improve productivity.

The device for folding the air bag has a lower panel provided with an inlet port to which gas is introduced and an upper panel located opposite to the lower panel. The device comprises a table for placing the air bag; inflating means for introducing the gas into the air bag; storing means for folding the air bag toward an inlet port from a peripheral part of the air bag; a guide member; and shifting means. The guide member is located between the storing means and allows the portions of the upper panel and lower panel on the lines directed toward the inlet port to be close to each other. The shifting means pushes the center part of the upper panel that is projected from the folded part toward the inlet port.

In the folding device, the air bag is held in place by the guide member so that the portions of the upper panel and the lower panel are close to each other on the lines directed toward the inlet port at predetermined positions whereas the portions of the upper panel and the lower panel between the lines are not held in place and are partially separated from each other. The portions of the upper panel and the lower panel between the lines are pushed toward the inlet port and are folded so that the portions of the upper panel and the lower panel are not engaged with each other, and each panel is folded in a wave-like configuration to collectively form a folded part. The portions of the upper and the lower panels on the lines are pushed against the outer circumference of the folded part. Therefore, the gas introduced from the inlet port is supplied effectively to a peripheral part of the air bag, so that the air bag inflates efficiently. Furthermore, since the height of the entire surface of the air bag is not held in place at the time of storing the air bag, a large member becomes unnecessary which is required to hold the entire surface in place so that the work of swiftly folding the air bag with a device having a simple structure becomes possible, and the manufacturing costs are decreased. Furthermore, the air bag is reshaped in a desired configuration with the shifting means, so that the folded air bag can be accommodated more easily while a portion of the upper panel that is moved overlaps without engaging the folded part of the air bag.

The folding device can comprise a table for placing the air bag; inflating means for introducing the gas into the air bag; storing means for folding the air bag toward the inlet port from a peripheral part of the air bag; and a guide member. The guide member is provided with a first guide part located between the storing means and allows the upper panel and the lower panel to be close to each other along lines directed toward the inlet port. A second guide part is located at the inlet port side of the first guide part and allows for the accommodation for storing the folded air bag.

In the folding device, the air bag is held in place by the first guide part of the guide member so that the portions of the upper panel and the lower panel are close to each other on the lines directed toward the inlet port at predetermined positions whereas the portions of the upper panel and the lower panel between the lines are not held in place and are separated from each other. The portions of the upper panel and the lower panel between the lines are pushed toward the inlet port by the second guide part of the guide member and are folded so that the portions of the upper panel and the lower panel are not engaged with each other, and each panel is folded in a wave-like configuration to collectively form a folded part. Therefore, the gas introduced from the inlet port is supplied effectively to a peripheral part of the air bag, so that the air bag inflates efficiently. Furthermore, since the height of the entire surface of the air bag is not held in place at the time of storing the air bag, a large member becomes unnecessary for holding the entire surface in place, the folding device is fast and has a simple structure, and the manufacturing costs are decreased.

The folding device can comprise a table for placing the air bag; supporting and lifting means for supporting the central portion of the upper panel located opposite to the inlet port to partially separate the lower panel from the upper panel; storing means for folding the air bag toward the inlet port from the peripheral part of the air bag; a guide member; and shifting means. The guide member is located between the storing means and allows the portions of the upper panel and lower panel on the lines directed toward the inlet port to be close to each other. The shifting means pushes the center part of the upper panel that is projected from the folded part toward the inlet port.

In the folding device, the air bag is held in place by the guide member so that the portions of the upper panel and the lower panel are close to each other on the lines directed toward the inlet port at predetermined positions whereas the portions of the upper panel and the lower panel between the lines are not held in place and are separated from each other. The portions of the upper panel and the lower panel between the lines are pushed toward the inlet port and are folded so that the portions of the upper panel and the lower panel are not engaged with each other, and each panel is folded in a wave-like configuration to collectively form a folded part. Therefore, the gas introduced from the inlet port is supplied effectively to a peripheral part of the air bag, so that the air bag inflates efficiently. Furthermore, since the height of the entire surface of the air bag is not held in place at the time of storing the air bag, a large member becomes unnecessary for holding the entire surface in place, the folding device has a simple structure and folds air bags quickly, and the manufacturing costs are decreased. Furthermore, the air bag is reshaped in a desired configuration with the shifting means, so that the folded air bag can be accommodated more easily while a portion of the upper panel that is moved overlaps without engaging the folded part of the air bag.

The folding device can comprise supporting and lifting means that comprise a gas generator constituting an air bag device. The gas generator can be provided separately from the air bag and assembled inside the folded air bag. The manufacturing cost of the air bag is reduced.

The folding device can comprise exhaust regulating means for regulating the exhaust of the gas from the air bag. When a slight amount of gas is present inside the air bag, the air bag can be folded. This modification results in the faster supply and exhaust of gas to the air bag and allows components to be removed or simplified to improve productivity.

The folding device can comprise pressing means for reshaping the air bag into a desired configuration by pressing the portions of the upper and the lower panels on the lines that are held in place against the outer circumference of the folded part of the air bag. Therefore, the folded air bag can be accommodated easily into a vessel.

An air bag comprises a lower panel that serves as the surface portion on the one side that includes an inlet port to which the gas is supplied and an upper panel that serves as the surface portion on the other side located opposite to the lower panel. The upper and lower panels are not engaged substantially with each other and are folded in independent wave-like configurations toward the inlet port while ear parts comprising the portions of the upper and lower panels on the lines directed toward the inlet port are flattened along a spiral configuration on the folded part. Since the upper and lower panels in the ear parts are not engaged with each other, the gas flows to the end of the ear parts from the inlet port through the peripheral part, and the ear parts can be wound back. Therefore, the inflation process is improved.

The portion of the upper panel of the air bag located above the inlet port can be arranged in a single-layered, planar configuration so that the gas supplied from the inlet port can be transferred efficiently to the outer circumference of the central part of the folded air bag and the ear parts.

The air bag can comprise a front surface development part on the central portion of the upper panel that can be inflated swiftly toward the front surface side immediately after the inflow of the gas to break a cover body that covers the folded air bag and inflate the air bag efficiently.

The air bag can be further characterized since the upper panel of the air bag is not folded with the lower panel. Therefore, the gas supplied from the inlet port is transferred efficiently through the air bag, thereby improving the inflation process.

BRIEF DESCRIPTION OF THE DRAWINGS

FIG. 1(a) is an explanatory view; FIG. 1(b) is a sectional view taken along line I-0-II of FIG. 1(a);

FIG. 14(a) is an explanatory view; FIG. 14(b) is a sectional view taken along line I-0-II of FIG. 14(a);

FIG. 18(a) is an explanatory view; FIG. 18(b) is a sectional view taken along line I-0-II of FIG. 18(a);

FIG. 26 is a sectional view taken along line III—III of the folding step of FIG. 25; and FIG. 27 is a perspective view of a folding configuration of an air bag.

DETAILED DESCRIPTION OF THE INVENTION

Figure 2:
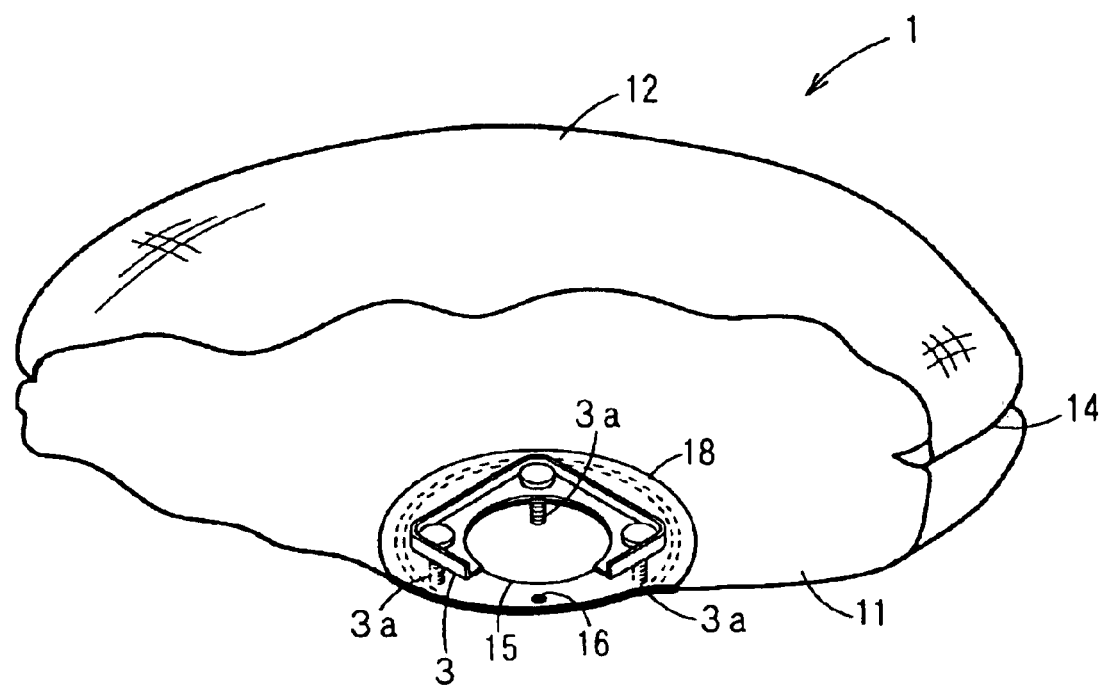
FIG. 2 is a perspective cutaway view of a retainer assembled in an air bag.

A collision safety device such as an air bag device or an air bag module is provided on a steering wheel of a vehicle such as an automobile. The air bag device comprises an air bag 1, a retainer 3, an attachable base plate, a cover body that is formed of synthetic resin and can be broken, and an inflator, as shown in FIG. 2. Stud bolts 3a can be projected through the ring-like retainer 3. The inflator is a gas generator that injects gas into the air bag 1 which is projected substantially toward the driver that is being protected. This direction of projection is toward the front surface side of the air bag 1. The rear surface side of the air bag 1 faces the steering shaft of the vehicle. At the moment of collision, this air bag device injects gas from the inflator and inflates the folded air bag 1. The inflation pressure of the air bag 1 breaks the cover body at a predetermined tear line, and the inflated air bag projects in front of the driver to protect the driver from the impact of the collision.

The air bag 1 is formed in a flat bag-like configuration by stitching together two sheets of base cloth having approximately the same circular shape. The two sheets comprise a lower panel 11 and an upper panel 12. The air bag 1 is formed by overlapping the two sheets, stitching them together at a peripheral part 14, and reversing the stitched sheets inside out via an inlet port 15. The inlet port 15 has a circular hole-like configuration for the insertion of the inflator that is located at the center of the lower panel 11. Attachment holes 16 are formed on the lower panel 11 at the periphery of the inlet port 15 to allow the insertion of stud bolts 3a. The attachment holes 16 are reinforced with ring-like reinforcement cloth 18. Vent holes (not shown) are formed on the lower panel 11. Furthermore, the panels 11 and 12 are formed of non-coated base cloth which is 200 g/m² using 315 denier thread formed of 6,6-nylon which is a polyamide synthetic fiber and has a diameter of 650 mm. The non-coated base cloth is free of coatings of elastomer or the like.

Figure 1:
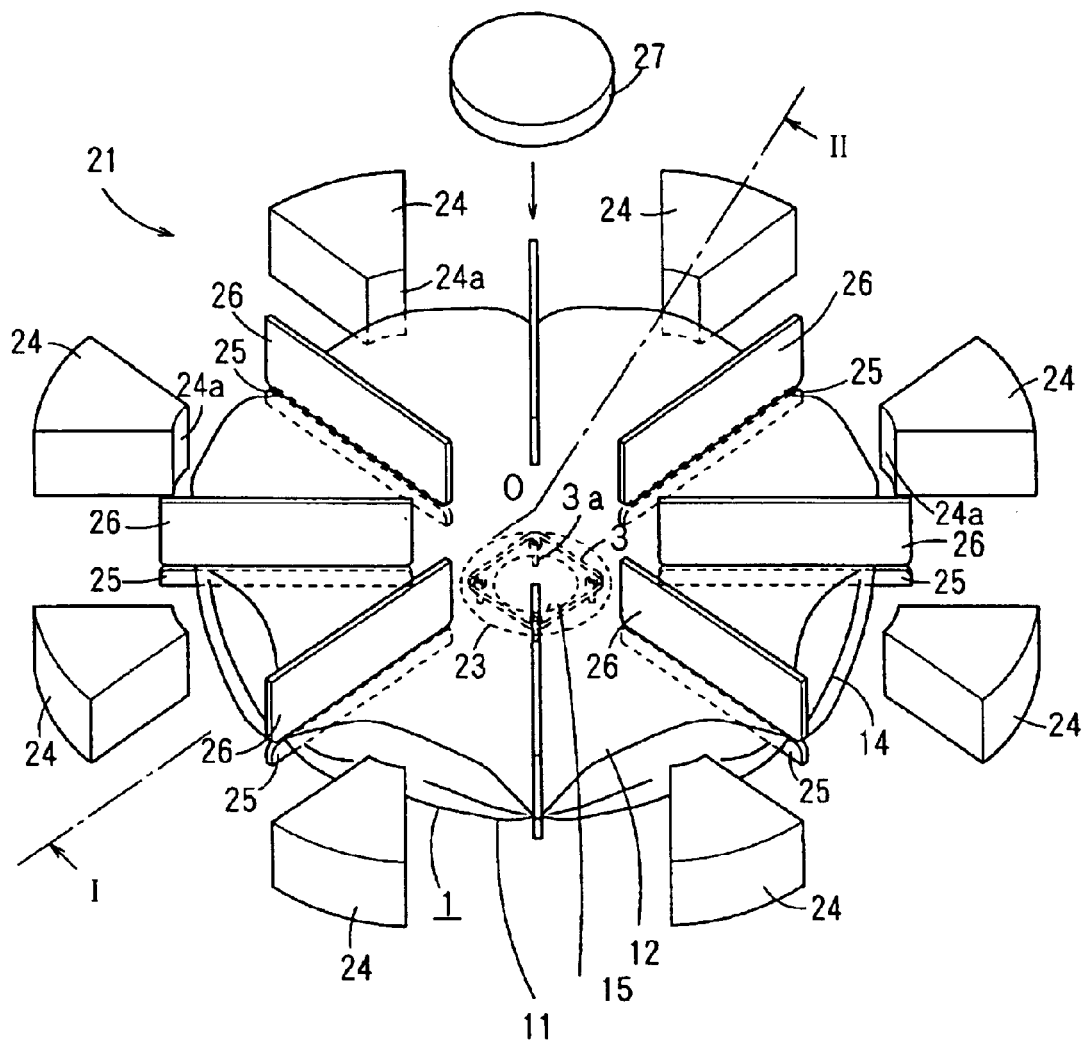
FIG. 1 shows a folding step following FIG. 6 for a method for folding an air bag, an air bag device, and an air bag according to the present invention.
Figure 1:
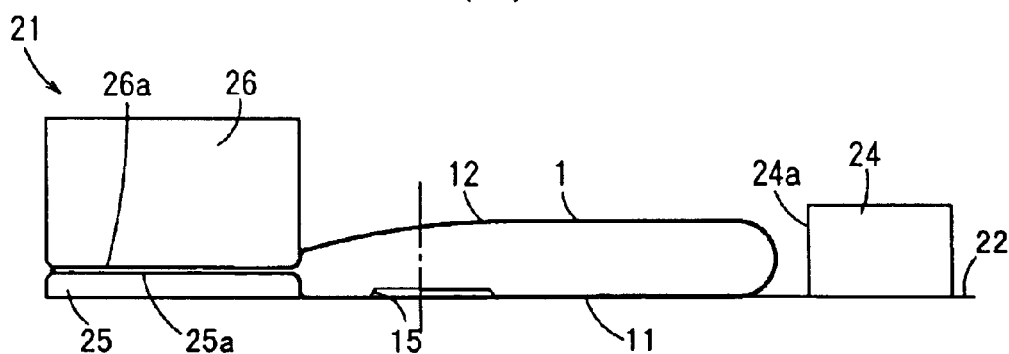
Figure 3:
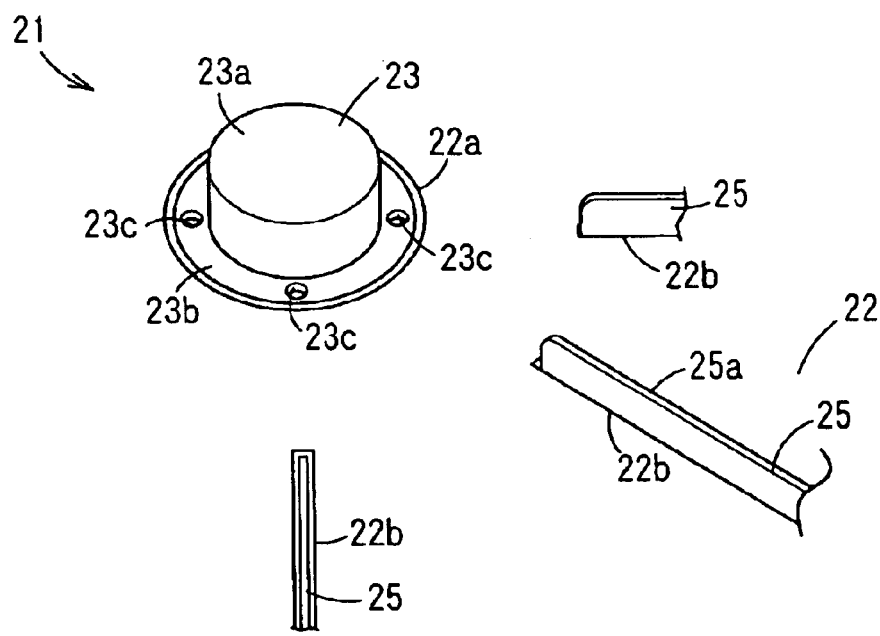
FIG. 3 is a perspective view of a part of a folding device.
Figure 6:
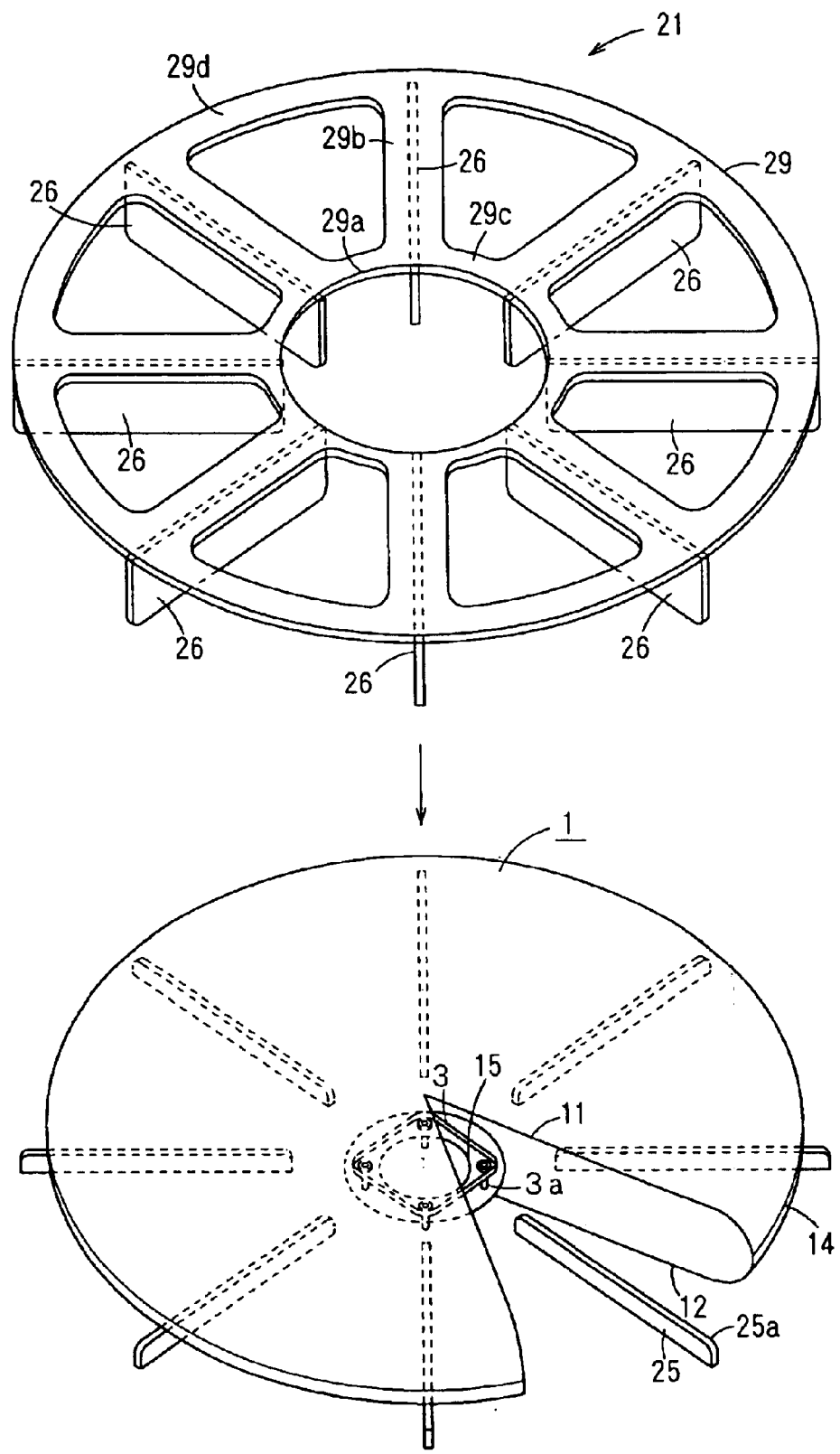
FIG. 6 is an explanatory view of a folding step following FIG. 5.

A device 21 for folding an air bag comprises a table 22, a center block 23 which serves as inflation means and pressing means, movable blocks 24 which serve as storing means, a lower blade 25, an upper blade 26 which serves as a guide member, a center plate 27 which serves as shifting means, and control means (not shown), as shown in FIGS. 1, 3, and 6. The control means controls the components of the folding device 21, a power source device, and a driving source.

The upper surface of the table 22 includes an approximately horizontal disk. A center block 23 is located in a circular hole 22a in the central part of the disk. The center block 23 comprises a column part 23a which is formed like the inflator and a peripheral part 23b which surrounds the column part 23a. The peripheral part 23b and the column part 23a are concentric, and the peripheral part 23b is positioned lower than the surrounding column part 23a. A rotation mechanism, which rotates through an arbitrarily fixed angle up to approximately 90 degrees, and a lifting mechanism, which moves up and down an arbitrarily fixed distance of approximately 160 mm, are assembled in the center block 23. Furthermore, an air nozzle is embedded in the center block 23 as air supply means for injecting air. The center block 23 can be fixed by inserting the stud bolts 3a of the retainer 3 through a circular hole-like holding part 23c located at predetermined intervals on the center block 23.

Slit parts 22b on the table 22 are formed in a radial configuration centering on the circular hole 22a. Lower blades 25 having a vertical flat plate-like configuration can move up to a predetermined height from the disk surface of the table 22. The lower blades 25 are raised or lowered in the vertical direction within each of the slit parts 22b. The horizontal upper surface of each lower blade 25 is a guide part 25a. The edges on the inner and outer circumference sides of the guide part 25a are formed in a smooth curve-like configuration.

Movable blocks 24 are located between each of the lower blades 25. Each of the movable lower blades 25 is connected to driving means arranged on the lower side of the table 22 via a slit (not shown) that is provided on the table 22. The movable blocks 24 are guided and driven to advance and retreat between the vicinity of the center block 23 and the peripheral part of the table 22. Each of the movable blocks 24 forms a planar surface having an approximately fan-like shape, and a curved pressing surface on the inner circumference side located opposite to the center block 23.

The upper blades 26 are arranged lengthwise in the radial direction and are attached to the lower surface of an upper plate 29 located above the table 22, as shown in FIG. 6. The upper blades 26 and the upper plate 29 are raised or lowered together in the vertical direction. Each of the upper blades 26 is arranged above a respective lower blade 25, and each pair is arranged to alternate with the movable blocks 24 in the circumferential direction. The upper blades 26 have a vertical plate-like configuration in the same manner as the lower blades 25. A guide part 26a of the upper blade 26 is the horizontal upper surface of the lower blade 25. The edges on the inner and outer circumference sides of the guide part 26a are formed as smooth curves. Each of the upper blades 26 is approximately equal in length and thickness to the lower blades 25. However, the height of the upper blade 26 is longer than the height of the lower blades 25.

The upper plate 29 comprises support parts 29b, a connection part 29c, and a connection part 29d. The support parts 29d are arranged in a radial configuration and attach to each of the upper blades 26. The connection part 29c on the inner circumference side of the upper plate 29 connects the inner circumference ends of the support parts 29b. The connection part 29d on the outer circumference side connect the outer circumference ends of the support parts 29b.

The guide parts 25a and 26a are the edges of the upper blades 26 and lower blades 25 which are located close to the air bag 1. The air bag 1 experiences an appropriate resistance to sliding since the guide parts 26a and 25a have been embossed or have been covered with elastomer tape.

Eight movable blocks 24 and eight sets of upper and lower blades 26 and 25 are provided, as shown in FIG. 1(a). The blades are designed in consideration of the volume of the air bag 1.

A circular hole 29a at the center of the upper plate 29 has approximately the same diameter as a disk-like center plate 27. The center plate 27 is arranged inside the circular hole 29a.

The steps for folding the air bag 1 are shown in FIGS. 1–13, and the movable blocks 24 are omitted in FIGS. 3 and 6.

FIG. 3 shows the initial state in which the center block 23 is arranged so that the peripheral part 23b is aligned with the disk surface of the table 22. The lower blades 25 are lowered in the downward direction from the upper surface of the table 22. The upper blades 26 and the center plate 27 are raised in an upward direction and the movable blocks 24 move to the outer circumference of the table 22. The stud bolts 3a have been removed in advance from the attachment holes 16 to insert the retainer 3 through the inlet port 15 into the inside of the air bag 1.

Figure 4:
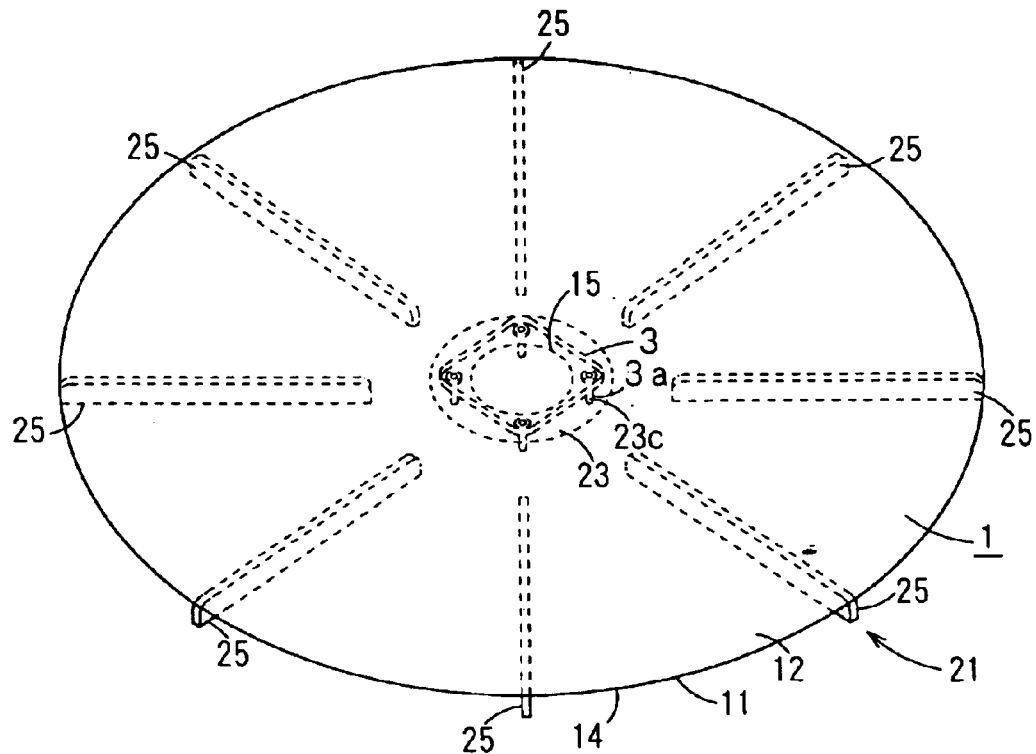
FIG. 4 is a perspective view of a folding step of an air bag.

FIG. 4 shows the stationary air bag 1 spread out on the table 22. The column part 23a of the center block 23 is inserted into the inlet port 15, and each of the stud bolts 3a is inserted into the holding part 23c. The stud bolts 3a are fixed with a locking mechanism provided in the holding part 23c.

Figure 5:
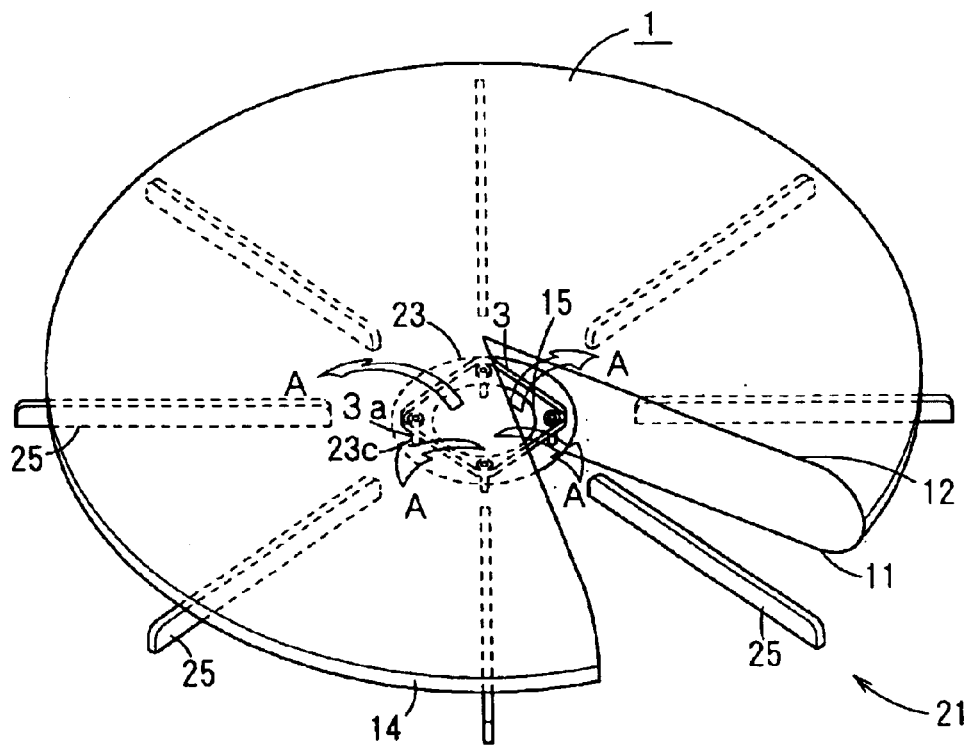
FIG. 5 is an explanatory view of a folding step following FIG. 4.

FIG. 5 shows the inflating step of the holding and inflating step in which compressed air is blown into the air bag 1 in the direction A to form an air pillow configuration. The compressed air is supplied from an air nozzle provided on the column part 23a. The air bag 1 is in a partially inflated state.

FIG. 6 shows the holding step in the holding and inflating step in which the lower blade 25 projects upward from the upper surface of the table 22, and the upper blade 26 is lowered to contact the air bag 1. FIG. 1 shows the air bag 1 being sandwiched between the lower blade 25 and the upper blade 26 in order to deflate portions of the air bag 1 that lie along the line extending in the radial direction that corresponds to the position of the upper and lower blades 26 and 25. A predetermined distance is fixed between the guide parts 26a and 25a of the upper and lower blades 26 and 25 in order to hold the height of the air bag 1 in place along the radial direction. Furthermore, the inner pressure of the air bag 1 has increased, and therefore, the portions of the air bag 1 that do not lie between the guide parts 25a and 26a expand since the height of those portions is not held in place. In these portions, the upper and lower panels 12 and 11 separate. However, the upper panel 12 of the air bag 1 does not rise high enough to contact the upper plate 29.

Figure 7:
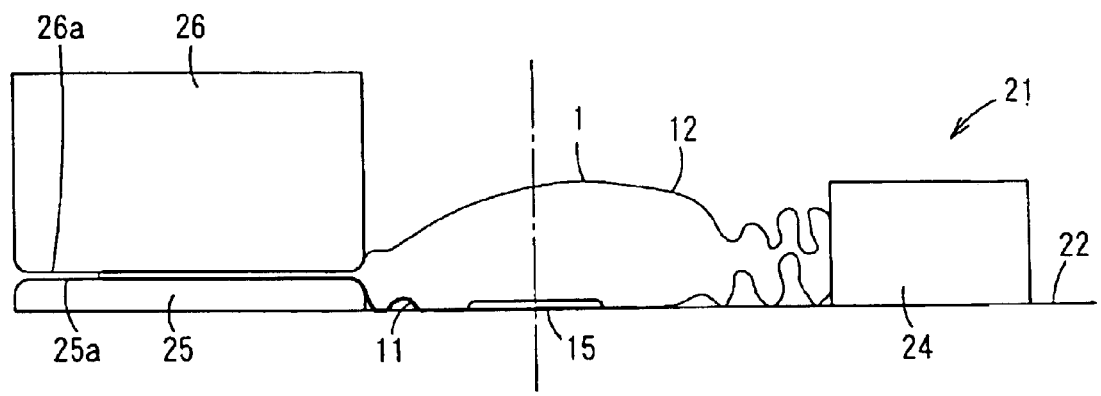
FIG. 7 is an explanatory view of a folding step following FIG. 1.
Figure 8:
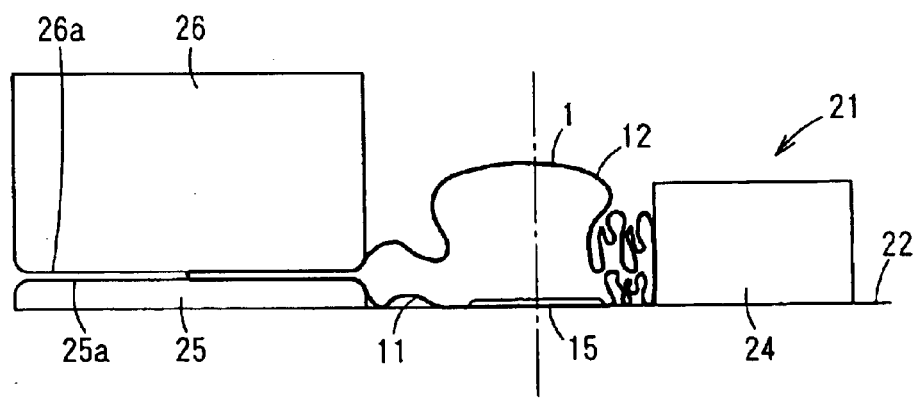
FIG. 8 is an explanatory view of a folding step following FIG. 7.
Figure 9:
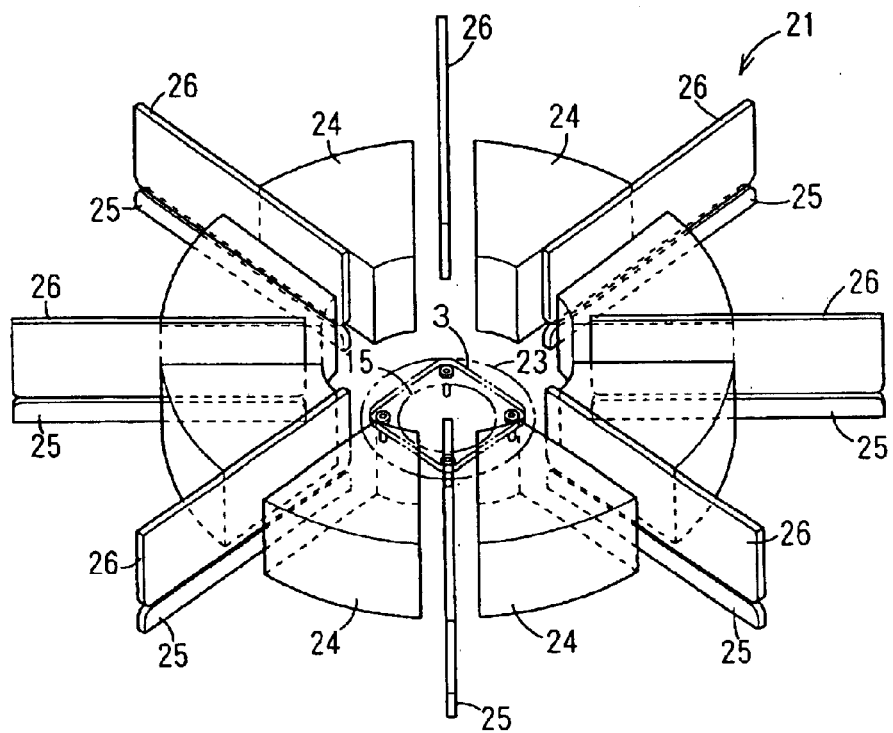
FIG. 9 is an explanatory view of a folding step following FIG. 8.
Figure 10:
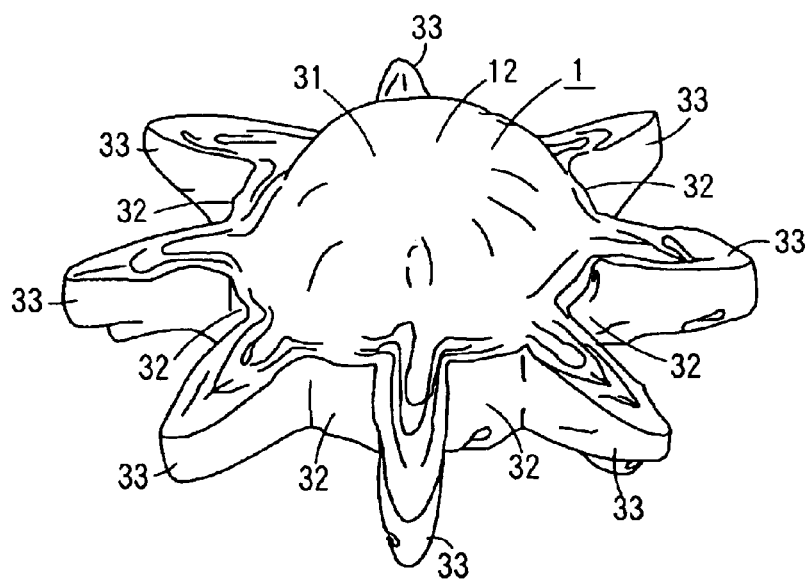
FIG. 10 is a perspective view of FIG. 9.

FIGS. 7–9 show a sequence of steps that comprise the storage step in which the movable blocks 24 are interlocked and move collectively toward the central point O. Portions of the air bag 1 are folded by being pressed by the movable blocks 24 toward the central point O. However, the upper and the lower panels 12 and 11 are not folded into each other and are folded independently in a loose wave-like configuration. FIG. 10 is a perspective view schematically showing the air bag 1 at an intermediate step of folding. A central part 31 rises toward the center in a dome-like configuration. Wave-shaped fitting parts 32 are formed on the periphery of the central part 31, and ear parts 33 are formed at the portions of the air bag 1 that are sandwiched between the upper and lower blades 26 and 25.

Figure 11:
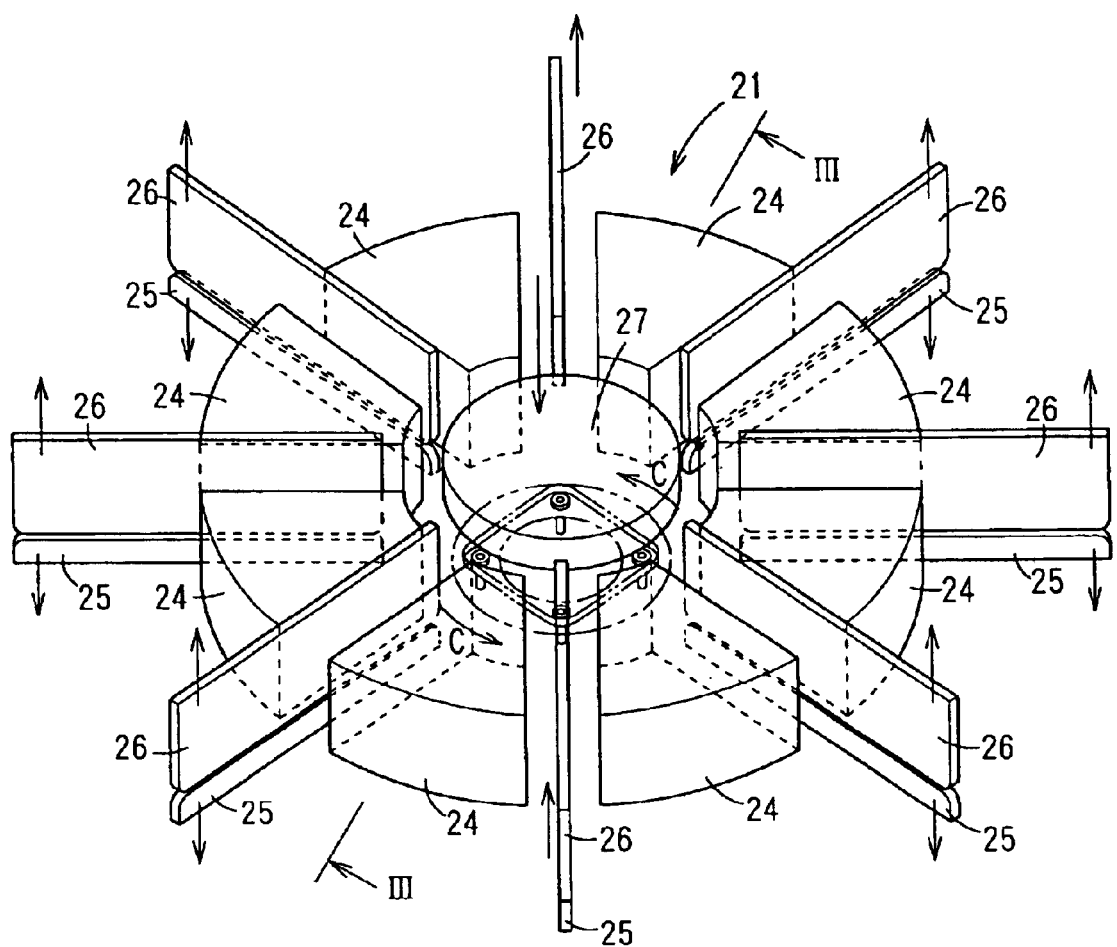
FIG. 11 is an explanatory view of a folding step following FIG. 9.

FIG. 11 shows the hold alleviating step in which the lower blade 25 is lowered in a downward direction while the upper blade 26 remains stationary. Therefore, the forces that compressed the ear parts 33 of the upper and lower panels 12 and 11 between the upper and lower blades 26 and 25 are weakened at least partially. The center plate 27 and the movable blocks 24 maintain the storage configuration of the air bag 1.

In the pressing step, the center block 23 holds down the central part of the air bag 1 as the center block 23 rotates through a predetermined angle in the direction C. The ear parts 33 are pulled to the side of the pressing parts 24a of the movable blocks 24 and flattened along the outer circumference of the wave-shaped fitting parts 32. The upper blades 26 prevent the ear parts 33 from unfolding, and the folded configuration of the air bag 1 is reshaped to a predetermined height. The position of the upper blades 26 can also be moved upward in the hold alleviating step.

Figure 12:
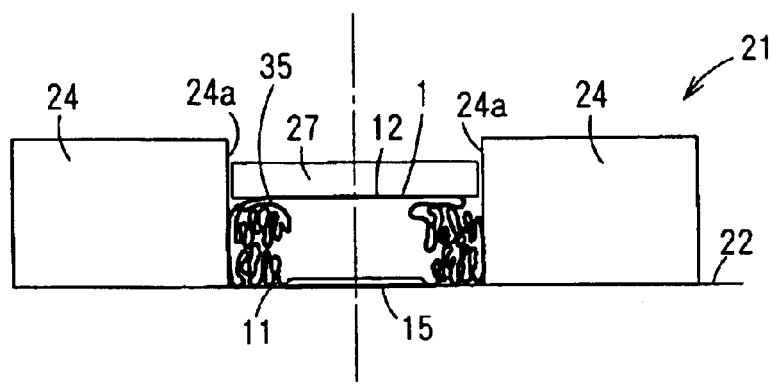
FIG. 12 is a sectional view taken along line III—III of FIG. 11.
Figure 13:
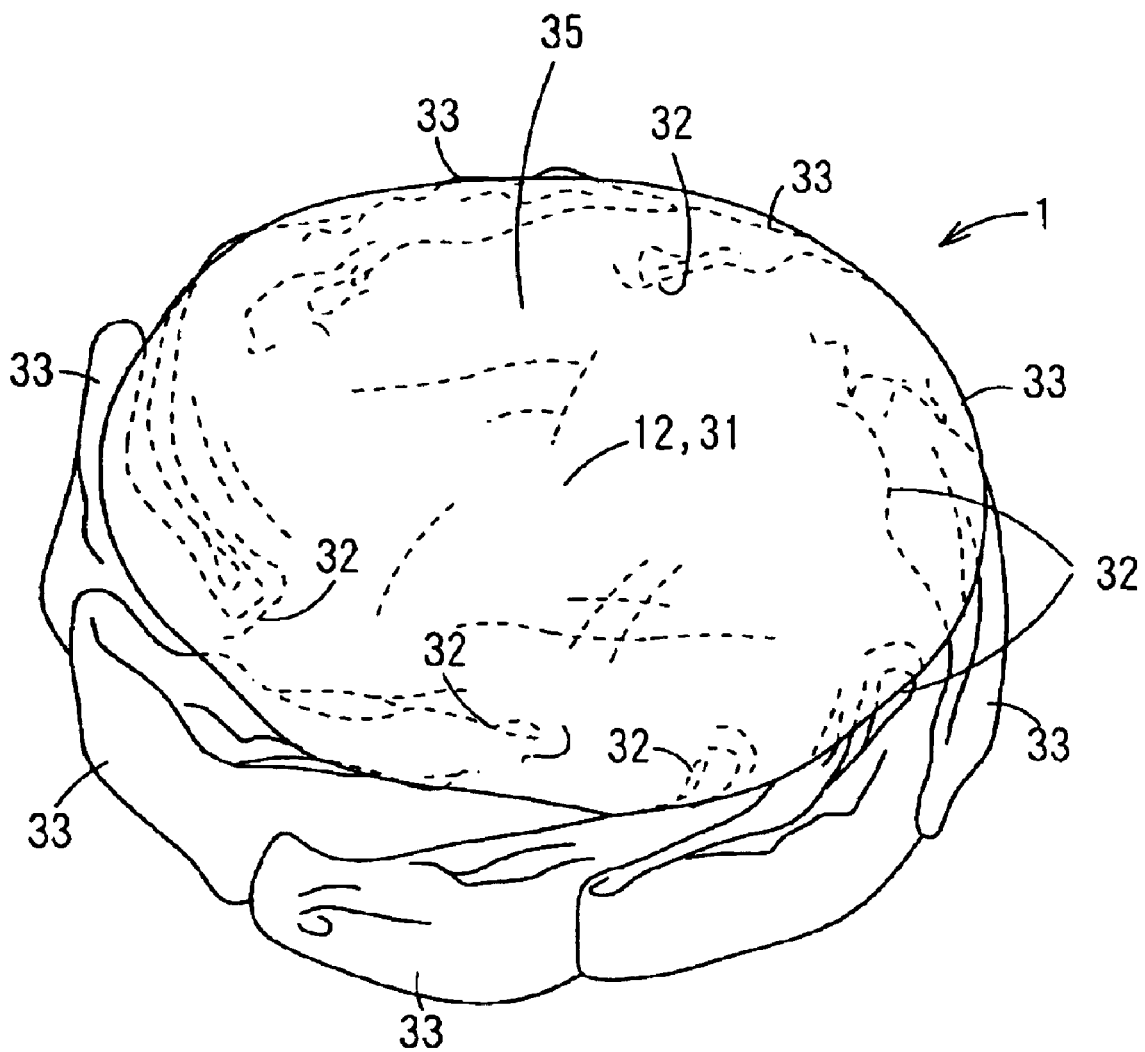
FIG. 13 is a perspective view of FIG. 12.

FIGS. 12–13 show the shifting step in which the center plate 27 is lowered so that the central part 31 which is inflated in an upward direction is pressed down to cover the folded portion of the air bag 1 as a front surface development part 35. The front surface development part 35 is not engaged with the other portions of the air bag 1. The center plate 27 controls the height depending on a predetermined accommodation size. The air bag 1 is folded and reshaped to a petal-like, octagonal configuration.

The folded air bag 1 is incorporated into an air bag device that operates the inflator, inflates the air bag 1, and breaks the cover body to form a projecting outlet port. The front surface developing part 35 located immediately above the inlet port 15 is inflated quickly toward the front surface side.

The upper and lower panels 12 and 11 are not tightly folded at the storage step. The upper and lower panels 12 and 11 are loosely intertwined in the wave-shaped fitting parts 32 and are folded in a mutually independent configuration so that that the upper and lower panels 12 and 11 are not folded into each other substantially. Therefore, a part of the upper and the lower panels 12 and 11 overlaps over the folded air bag 1 in the radial direction.

When gas is supplied from the inflator through an inlet port 15 at the center of the air bag 1, the upper and lower panels 12 and 11 can be separated easily. The ear parts 33 are flattened along the outer circumference of the wave-shaped fitting parts 32 and can be inflated quickly. The ear parts 33, the portions of the air bag 1 which are held in place by the upper and lower blades 26 and 25, are not intertwined with each other when the part is arranged along the spiral configuration shown in FIG. 13 on the outer circumference of the wave-shaped fitting parts 32. The inflation method is improved since the ear parts 33 are wound back and can be inflated easily. Therefore, the gas can be supplied to the ends of the ear parts 33, and the air bag 1 can be inflated quickly. The manufacturing cost is lower since the folding device 21 and the method for folding the air bag can be automated.

The portions of the upper surface of the air bag 1 that are not pushed by the movable blocks 24 are held in place by the upper blades 26. The height of the other portions that are pushed by the movable blocks 24 and do not contact the upper blades 26 are not held in place and are free to expand. Since the height of the upper surface is not held in place entirely, the upper and lower panels 12 and 11 separate from each other during inflation of the air bag 1. Therefore, the portions of the air bag 1 at the inlet port 15 and at the peripheral part 14 are not entangled.

After the storing step in which the movable blocks 24 move toward point 0, the upper and lower blades 26 and 25 can be withdrawn. Then, the center block 23 rotates in order to reduce the force applied to the upper and lower panels 12 and 11, and the air bag 1 can be folded efficiently.

Since the front surface developing part 35 is provided on the center of the front surface of the air bag 1, it can be used in the initial stage to break the cover body. Therefore, the gas pressure of the inflator can be used to inflate the air bag 1 efficiently, and the size air bag device can be reduced. The gas pressure of the inflator can be used more efficiently by increasing the secondary gas pressure since the primary peak pressure can be decreased.

The upper and lower panels 12 and 11 of the air bag 1 are not substantially engaged. However, the upper and lower panels 12 and 11 can be engaged partially depending on the characteristics of the upper and lower panels 12 and 11 and the operation speed of the components. Therefore, the manufacturing costs can be decreased.

The horizontal guide parts 25a and 26a are provided on the lower and upper blades 25 and 26 according to the invention as described above. However, the configuration of the guide parts 25a and 26a can be changed to guide the air bag 1 more smoothly depending on the amount of folding that is necessary.

Figure 14:
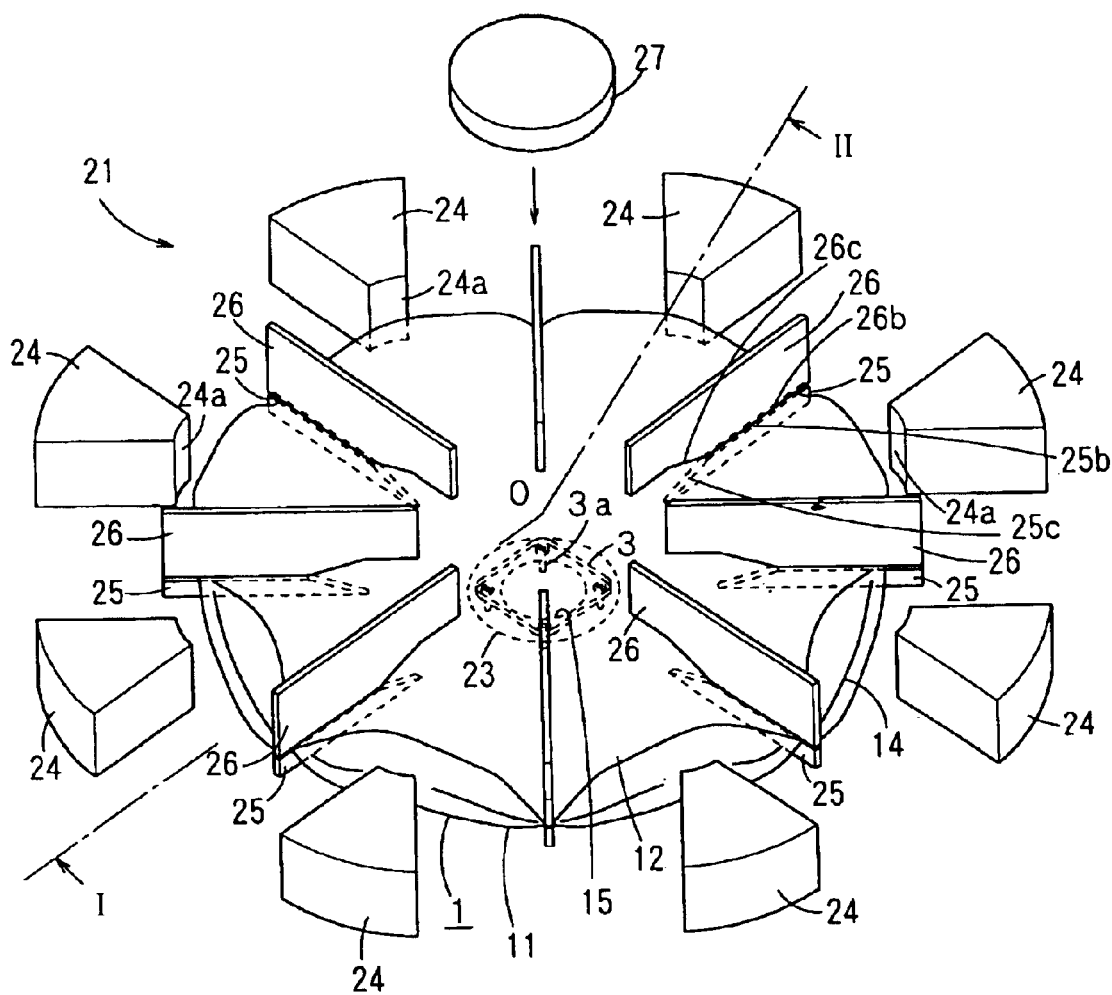
FIG. 14 shows a folding step of an embodiment of the present invention.
Figure 14:
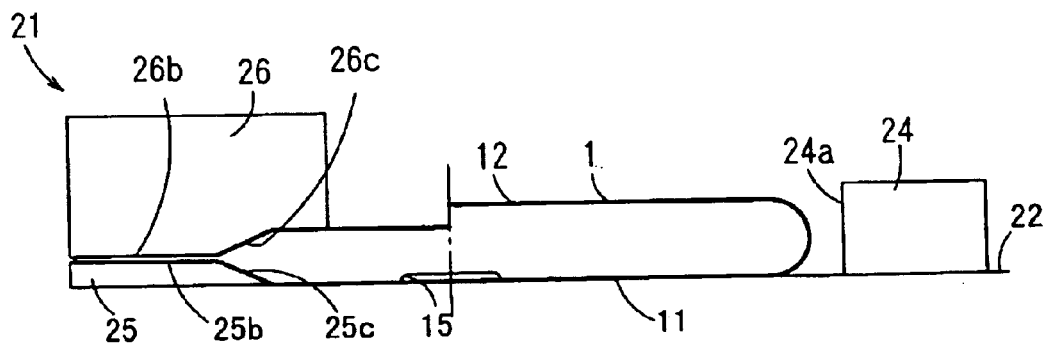
Figure 15:
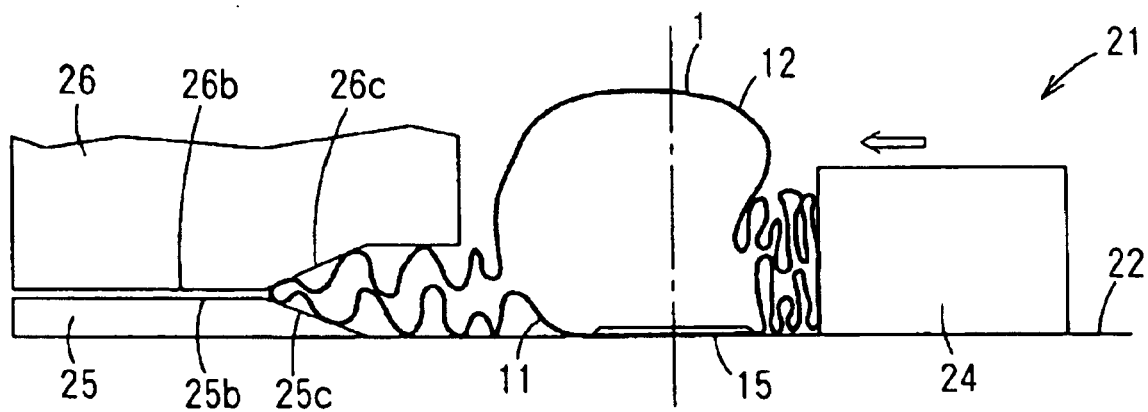
FIG. 15 is an explanatory view of a folding step following FIG. 14.

FIGS. 14–15 show the folding device 21 with a first guide part 25b which is a horizontal surface and a second guide part 25c inclining downward toward the inner circumference side of guide part 25 from the inner circumference side of the first guide part 25b. The height of the upper blade 26 is longer than the height of the lower blade 25. A horizontal first guide part 26b of the upper blade 26 is located opposite to the first guide part 25b of the lower blade 25, and a second guide part 26c of the upper blade 26 is located opposite to the second guide part 25c of the lower blade 25. A horizontal surface is positioned on the inner circumference side of the second guide part 26c which is a surface inclining upward toward the inner circumference side of the upper blade 26. The first guide parts 26b and 25b and the second guide parts 26c and 25c are edges at which the upper and the lower blades 26 and 25 contact the air bag 1 and have undergone an emboss process and are covered by elastomer tape or the like. The first guide parts 26b and 25b and the second guide parts 26c and 25c provide some resistance to sliding of the air bag 1.

FIG. 14 shows the holding step in the holding and inflating step in which the lower blade 25 projects upward from the upper surface of the table 22, and the upper blade 26 is lowered to contact the air bag 1. FIG. 14(b) shows the air bag 1 being sandwiched between the lower blade 25 and the upper blade 26 so that portions of the air bag 1 are deflated in a radial configuration. In this state, a predetermined distance is fixed between the first guide parts 26b and 25b of the upper and lower blades 26 and 25. The height of the air bag 1 between the first guide parts 26b and 25b is held in place, and the air bag 1 can slide in a radial direction.

FIG. 15 shows an intermediate state of the storing step in which the movable blocks 24 are interlocked and move collectively toward the central point O. Portions of the air bag 1 are folded by being pressed by the movable blocks 24 toward the central point O. However, the upper and the lower panels 12 and 11 are not folded into each other and are folded independently in a loose wave-like configuration. The central part 31 rises toward the center in a dome-like configuration, and wave-shaped fitting parts 32 are formed on the periphery of the central part 31. Furthermore, the portions of the air bag 1 which are sandwiched between the first guide parts 26b and 25b of the upper and lower blades 26 and 25 are pulled into the space located between the second guide parts 26c and 25c. The upper and lower panels 12 and 11 between the second guide parts 26c and 25c are not folded into each other and are folded in a wave-like configuration to form the ear parts 33.

During the pressing step, the lower blades 25 can be lowered in the downward direction. The upper blades 26 are stationary in the same manner as described above or can be raised in the upward direction. Then, the forces that compressed the ear parts 33 of the upper and lower panels 12 and 11 between the upper and lower blades 26 and 25 are weakened at least partially. The center plate 27 and the movable blocks 24 maintain the storage configuration of the air bag 1. From this state, the center block 23 holds down the central part of the air bag 1 as the center block 23 rotates through a predetermined angle in the direction C shown in FIG. 11, and the ear parts 33 are pulled to the side of the pressing parts 24a of the movable blocks 24 and flattened along the outer circumference of the wave-shaped fitting parts 32.

Figure 16:
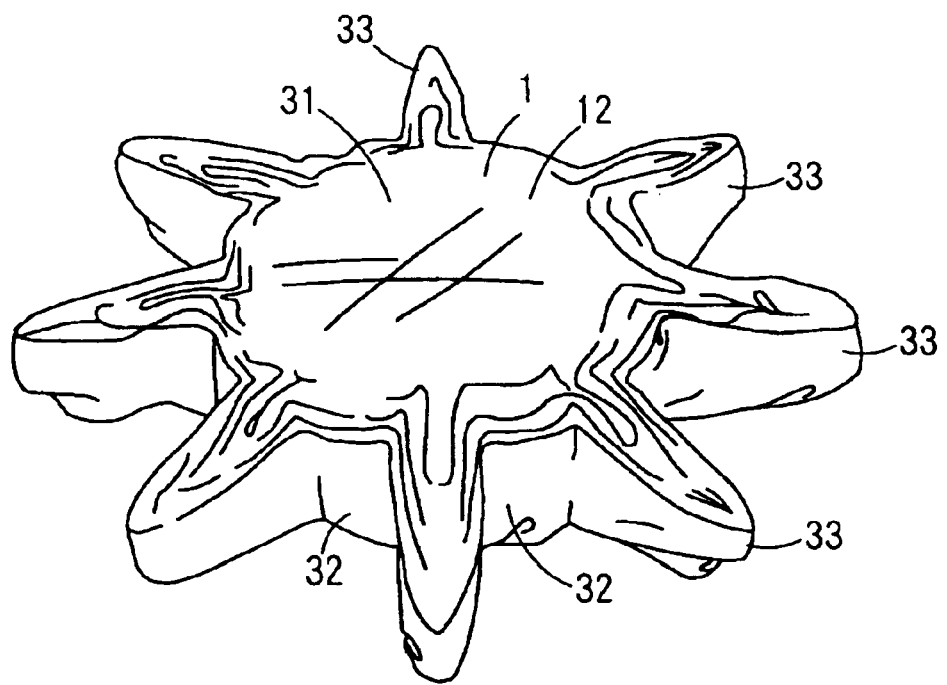
FIG. 16 is a perspective view of an air bag during the folding process.

FIG. 16 shows the shifting step in which the center plate 27 is lowered to a position located above the inlet port 15 of the lower panel 11 so that the air bag 1 can be folded into a predetermined petal-like configuration.

Figure 17:
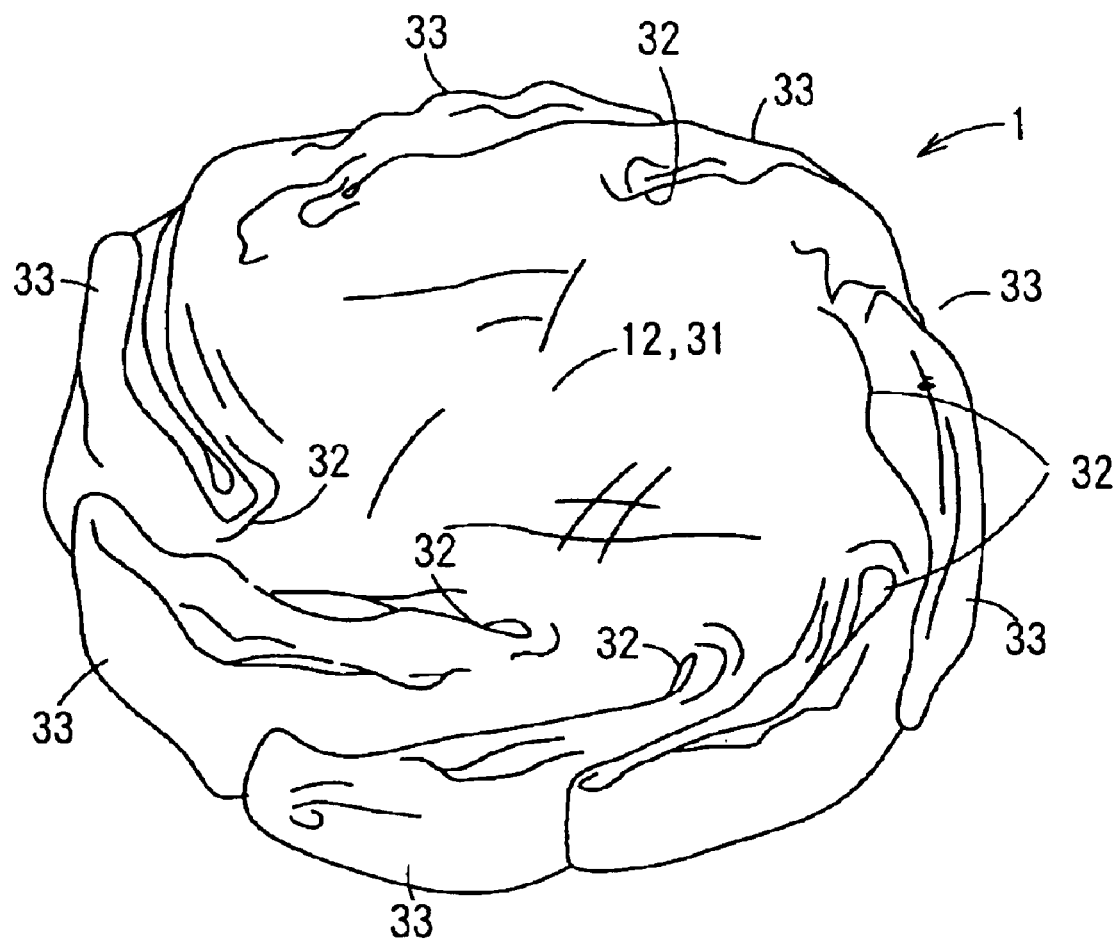
FIG. 17 is a perspective view of a folding configuration of an air bag.

FIG. 17 shows the folding configuration of the air bag 1. The portion of the upper panel 12 located above the inlet port 15 of the lower panel 11 is arranged in a planar configuration so that the gas supplied from the inlet port 15 can be transferred efficiently to the outer circumference of the central part 31, the wave-shaped fitting parts 32, and the ear parts 33.

The upper and the lower blades 26 and 25 are held in place during the holding and inflating step after the air bag 1 is inflated. However, the height can be controlled while the air bag 1 being inflated in order to decrease the number of steps required to operate the device.

The folding device 21 includes a column part 23a having the inflating means and a center block 23 having an air nozzle that constitutes the inflator. The retainer 3 is assembled inside the air bag 1 to fold the air bag 1. However, the air bag 1 can be folded after the inflator is assembled in the air bag 1. Therefore, the air supply means constituting the inflating means is not provided, and the gas present inside the air bag 1 can be used. Then, the air bag 1 is folded so that the opposing surface portions do not fold into each other substantially.

Figure 18:
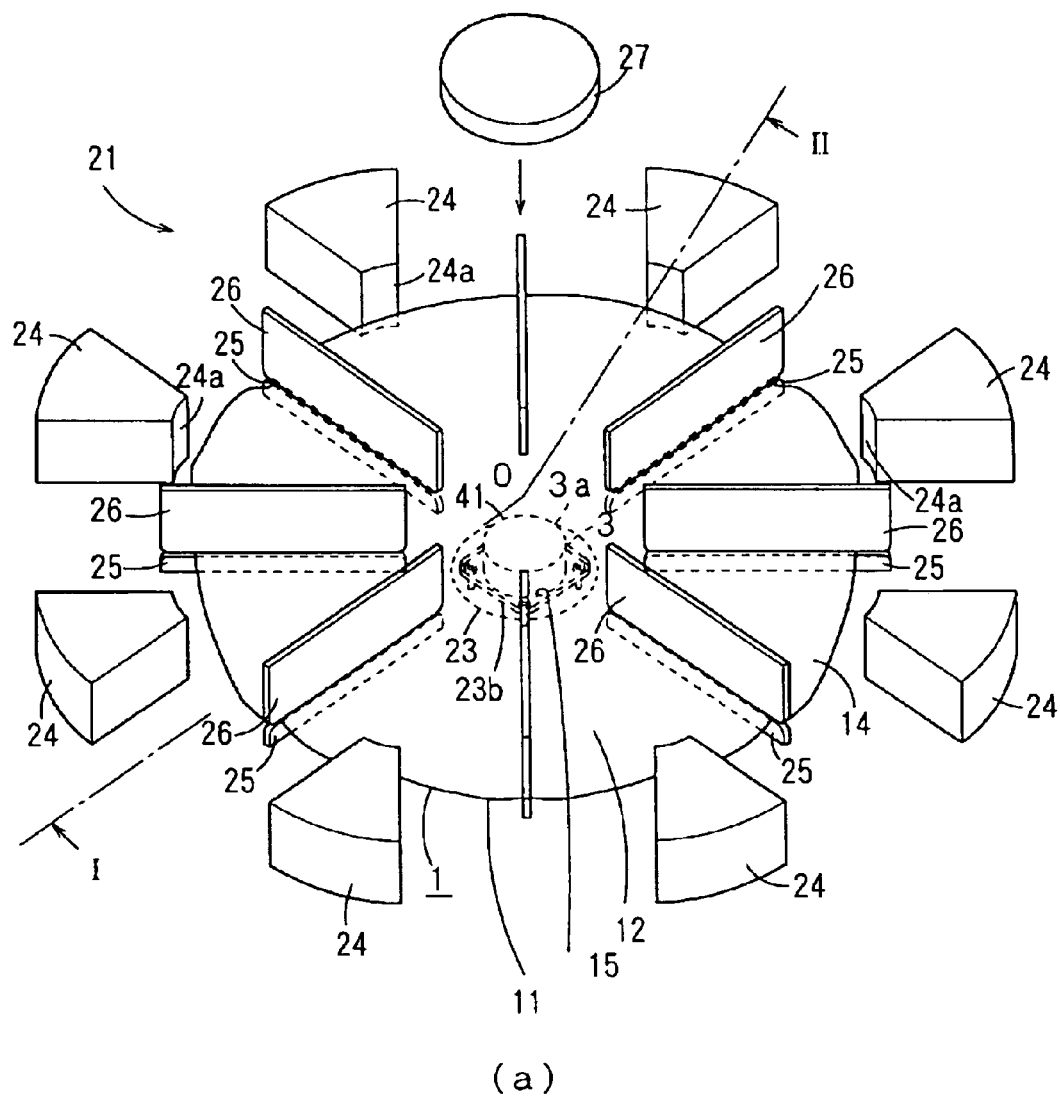
FIG. 18 shows a folding step following FIG. 20 for a method for folding an air bag, an air bag device, and an air bag according to an embodiment of the present invention.
Figure 18:
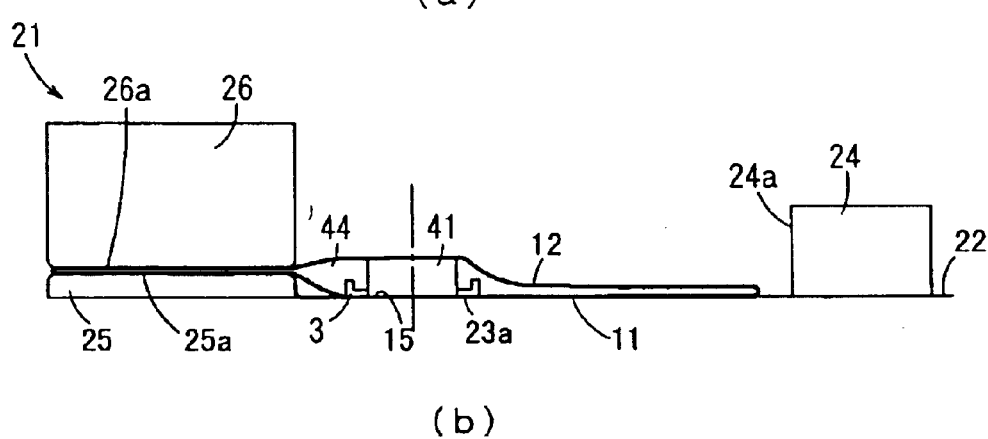

FIGS. 18 and 27 show an air bag 1 in which the inflator 41 serves as a gas generator that constitutes the supporting and lifting means and the exhaust regulation means. The inflator 41 is incorporated in advance into the air bag 1 without the inflating means.

The center block 23 of the folding device 21 does not include a column part 23a. The center block 23 comprises a holding part (not shown) of the gas generator, an inflator 41, a rotation mechanism, and a lifting mechanism. The holding part of the gas generator is located on the peripheral part 23b, and the inflator 41 is located on the holding part of the gas generator. The rotation mechanism rotates the inflator 41, and the lifting mechanism moves the inflator 41 up and down. Stud bolts 3a in the retainer 3 are inserted into attachment holes on the flange (not shown) of the inflator 41. The inflator 41 can be used instead of the retainer 3.

At the initial state, the disk surface of the table 22 is aligned with the flange of the inflator 41. The flange of the inflator 41 is attached to the peripheral part 23b of the center block 23. The lower blade 25 is lowered in a downward direction from the upper surface of the table 22. The upper blade 26 and the center plate 27 are raised in an upward direction, and the movable blocks 24 are pulled toward the outer circumference of the table 22. The retainer 3 is inserted in advance into the air bag 1 through the inlet port 15 as shown in FIG. 2, and the stud bolts 3a are removed from the attachment holes 16.

Figure 19:
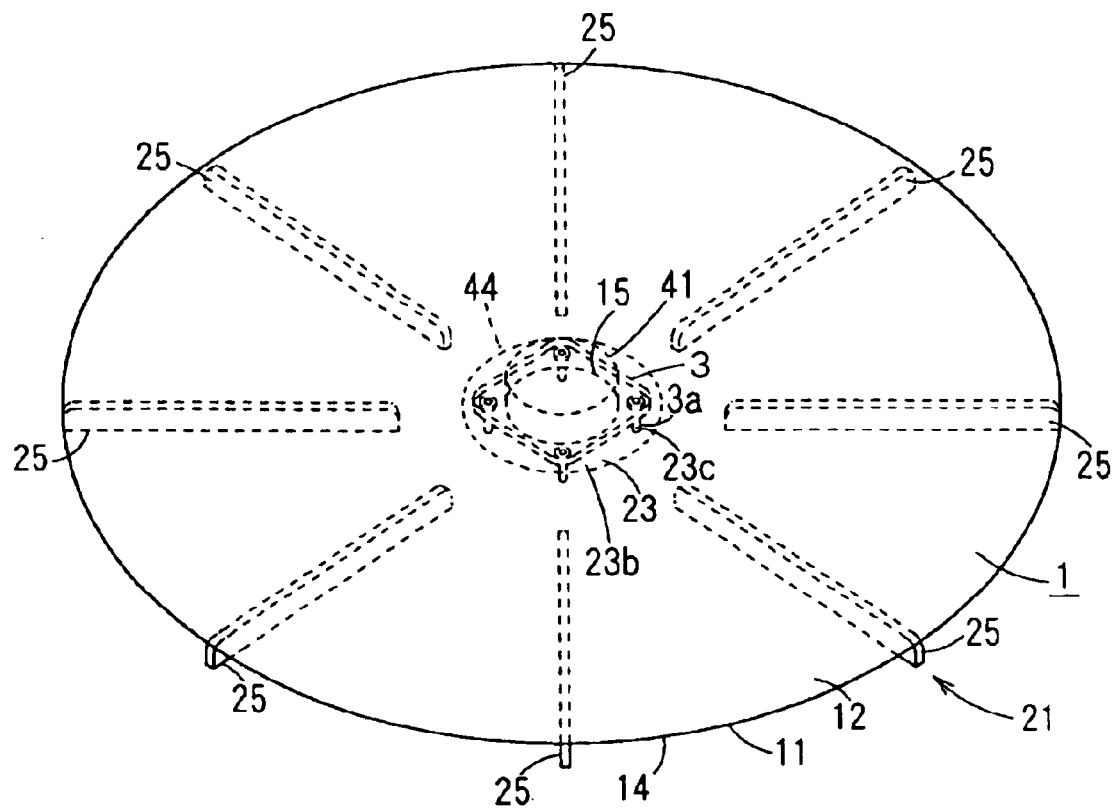
FIG. 19 is an explanatory view of a folding step in which a gas generator is assembled in an air bag.

FIG. 19 shows the supporting and lifting step in the holding, supporting, and lifting step in which the stationary air bag 1 is spread out on the table 22. A column part of the inflator 41 is inserted into the inlet port 15 while each of the stud bolts 3a is inserted through the attachment holes in the inflator 41 into the holding part 23c. The stud bolts 3a are fixed with a locking mechanism provided in the holding part 23c.

The center of the upper panel 12 of the air bag 1 is lifted by the inflator 41 and forms a ring-like space part 44 in which air is present. The inlet port 15 of the air bag 1 is approximately airtight against the inflator 41.

Figure 20:
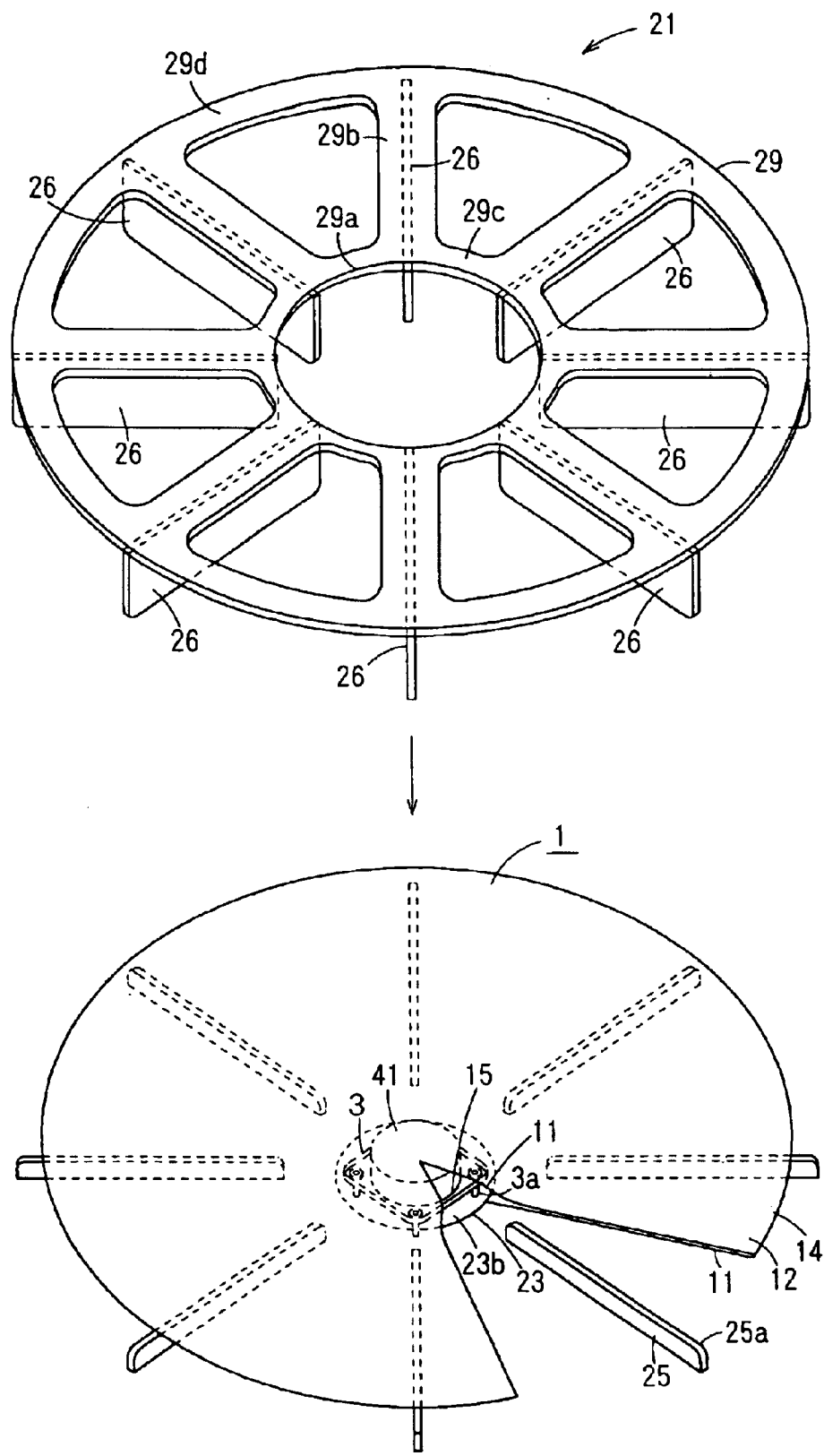
FIG. 20 is an explanatory view of the folding step following FIG. 19.

FIG. 20 shows the holding step of the holding, supporting, and lifting step in which the lower blade 25 is lifted to project upward from the upper surface of the table 22, and the upper blade 26 is lowered to contact the air bag 1. FIG. 18 shows the air bag 1 being sandwiched gently between the lower blade 25 and upper blade 26. A predetermined distance is fixed between the guide parts 26a and 25a of the upper and lower blades 26 and 25 in order to control the height of the air bag 1 along the radial direction.

Figure 21:
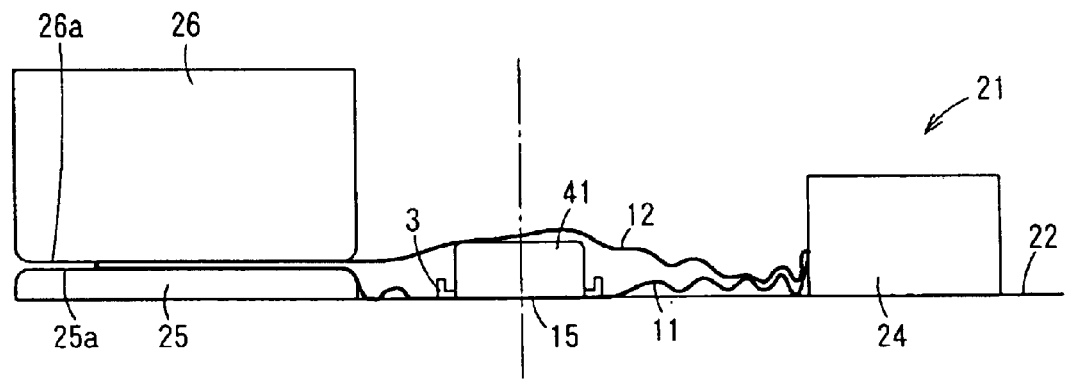
FIG. 21 is an explanatory view of the folding step following FIG. 18.
Figure 22:
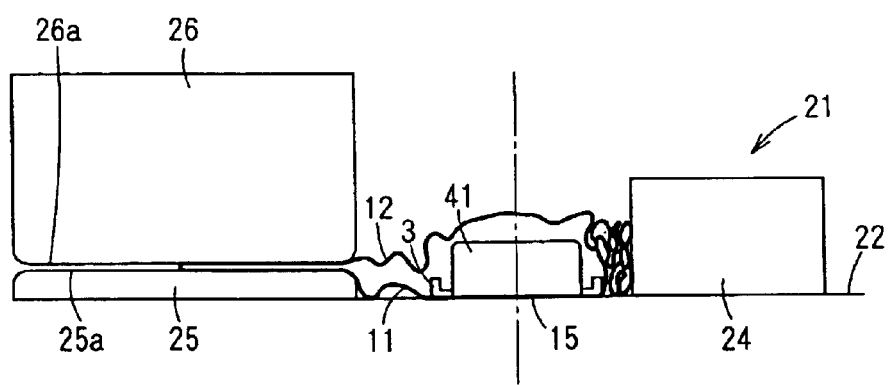
FIG. 22 is an explanatory view of the folding step following FIG. 21.
Figure 23:
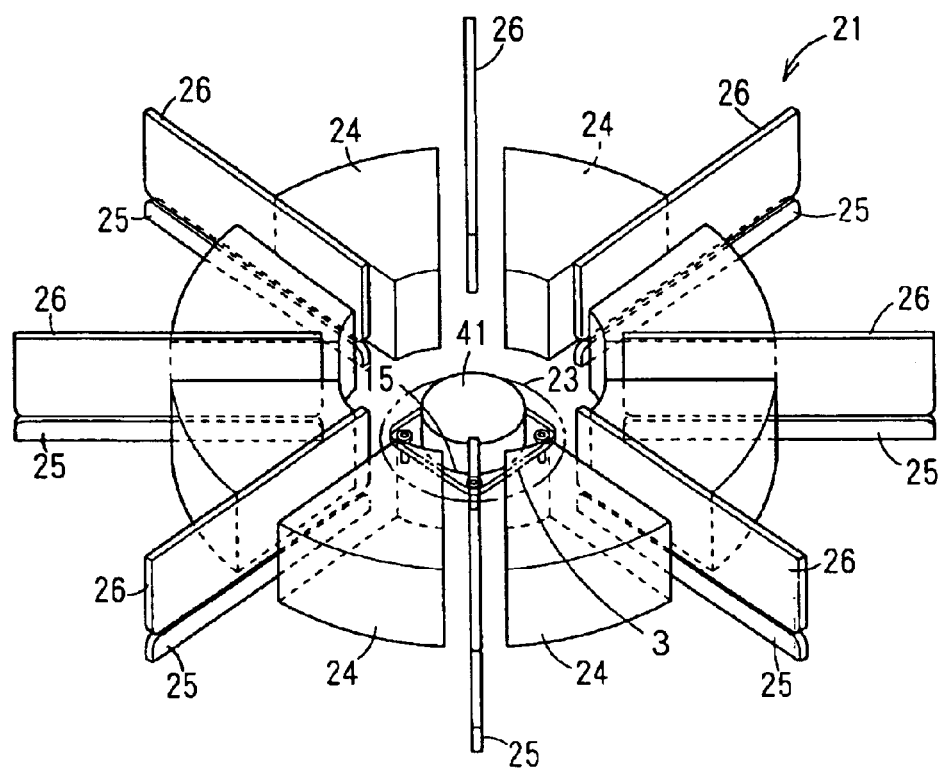
FIG. 23 is an explanatory view of the folding step following FIG. 22.
Figure 24:
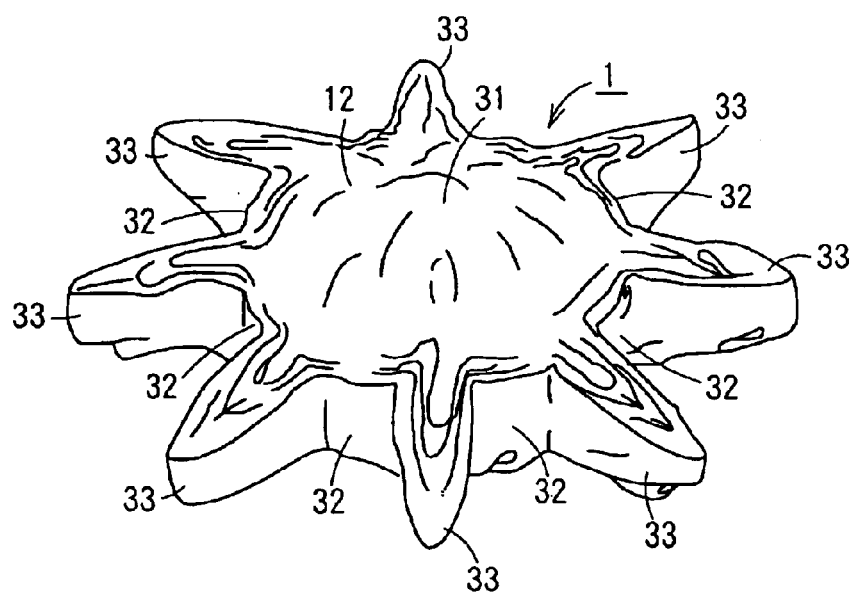
FIG. 24 is a perspective view of FIG. 23.

FIGS. 21–23 show a sequence of steps that comprise the storing step in which the movable blocks 24 are interlocked and move collectively and quickly toward the central point 0. FIG. 24 is a perspective view schematically showing the air bag 1 at an intermediate step of folding. The movable blocks 24 move at a sufficient speed in order to force air toward the inlet port 15. Since the inlet port 15 of the air bag 1 is approximately airtight, the air bag 1 can inflate with the slight amount of air that is present in the ring-like space part 44. Since each of the panels 12 and 11 is made of a cloth having a predetermined strength, the center of the upper panel 12 has a tendency to move upward above the inlet port 15 in a wave configuration. When the air bag 1 is pulled toward the inlet port 15, the air in the central part of the air bag 1 also forces the center of the upper panel 12 to move upward. Then, the upper and lower panels 12 and 11 separate from each other at the portion of the air bag 1 which is pressed by the movable blocks 24 toward the central point O and at the peripheral part of the inlet port 15. The upper and lower panels 12 and 11 are folded independently in a loose wave-like configuration. A central part 31 rises toward the center in a dome-like configuration. Wave-shaped fitting parts 32 are formed on the periphery of the central part 31, and ear parts 33 are formed at the portions of the air bag 1 that are sandwiched between the upper and lower blades 26 and 25. Furthermore, the inner pressure of the air bag 1 increases. Therefore, the portion of the upper panel 12 that is held in place is projected upward, and the upper and lower panels 12 and 11 separate from each other. However, the upper panel 12 of the air bag 1 does not rise high enough to contact the upper plate 29.

Figure 25:
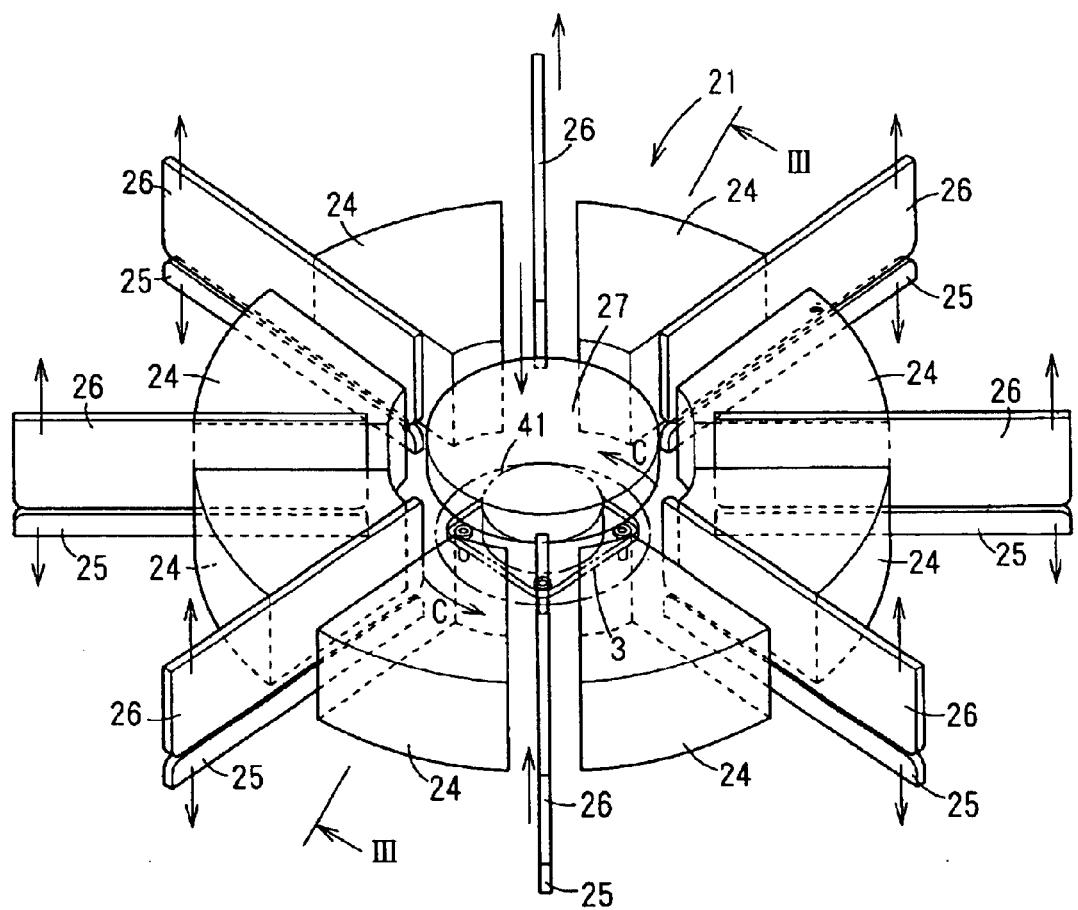
FIG. 25 is an explanatory view of the folding step following FIG. 23.

FIG. 25 shows the hold alleviating step in which the lower blade 25 is lowered in a downward direction. Therefore, the forces that compressed the ear parts 33 of the upper and lower panels 12 and 11 between the upper and lower blades 26 and 25 are weakened at least partially. The center plate 27 and the movable blocks 24 maintain the storage configuration of the air bag 1. During the pressing step, the center block 23 holds down the central part of the air bag 1 as the inflator 41 in the center block 23 rotates through a predetermined angle in the direction C. The ear parts 33 are pulled to the side of the pressing parts 24a of the movable blocks 24 and flattened along the outer circumference of the wave-shaped fitting parts 32. The upper blades 26 prevent the ear parts 33 from unfolding, and the folded configuration of the air bag 1 is reshaped to a predetermined height. The position of the upper blades 26 can also be moved upward in the hold alleviating step.

FIGS. 26–27 show the shifting step in which the center plate 27 is lowered so that the central part 31 which is inflated in an upward direction is pressed down to cover the folded portion of the air bag 1 as a front surface development part 35. The front surface development part 35 is not engaged with the other portions of the air bag 1. The center plate 27 adjusts the height depending on a predetermined accommodation size. The air bag 1 is folded and reshaped to a petal-like, octagonal configuration.

The step of supplying and exhausting the gas in the air bag 1 is not required in this embodiment. Each movable block 24 can be moved faster in the storing step. Therefore, the device can be simplified and the storing step can be completed faster, thereby improving productivity.

The ring-like space part 44 in the air bag 1 is formed on the periphery of the inlet port 15 when the inflator 41 of the center block 23 lifts the upper panel 12. Therefore, an appropriate amount of air is ensured while the central portion of the upper panel 12 is higher than the surrounding portion of the upper panel 12. During the storing step, the upper and lower panels 12 and 11 are not folded tightly into each other and are folded independently in a loose wave-like configuration. Therefore, the height between the upper and the lower panels 12 and 11 can be controlled so that the final tightness and folding configuration of the folded air bag 1 can be adjusted.

Additionally, an air bag can be provided on other vehicle components other than the steering wheel. The present invention can be applied to an air bag device on the instrument panel in front of a passenger's seat next to the driver's seat, the rear part of the rear passenger's seat, the side part of a seat, a door, and a pillar of the vehicle to protect the intended object from a collision or the like.

FIG. 1 shows a method for folding an air bag, a device for folding an air bag, and an air bag. The air bag 1 is held in place so that the upper and lower panels 12 and 11 draw closer to each other along lines directed toward the inlet port 15 created by upper and lower blades 26 and 25. The other portions of the upper and lower panels 12 and 11 that do not lie along these lines are inflated without being held in place so that these portions of the upper and lower panels 12 and 11 are separated from each other. The portions of the upper and lower panels 12 and 11 between the lines do not engage with each other and are folded in independently formed wave-like configurations that comprise a central stored form. The portions of the upper and lower panels 12 and 11 that are held in place are pressed against the outer circumference of the central stored form. The gas supplied from the inlet port 15 can be supplied efficiently to the peripheral part 14 of the folded air bag 1, thereby improving the inflation process.

When the holding step is performed before the inflating step, the force applied to the air bag 1 that is required during the holding and inflating step is not necessary. When the inflating step is performed before the holding step, the inner pressure of the air bag 1 can be increased so that the portion of the lower panel 11 between the lines is separated quickly and substantially from the portion of the upper panel 12 between the lines. The increased inner pressure of the air bag 1 allows the portions of the inflated air bag 1 to be held in place on the lines.

FIG. 18 shows the air bag 1 being held in place wherein the upper and lower panels 12 and 11 draw closer to each other along lines directed toward the inlet port 15 created by the upper and lower blades 26 and 25. The portions of the upper and lower panels 12 and 11 that lie between these lines are not held in place and inflate so that the upper and lower panels 12 and 11 are separated partially from each other. These portions of the upper and lower panels 12 and 11 are pressed against the inlet port 15 and are folded. The gas which remains inside the air bag separate these portions of the upper and lower panels 12 and 11 so that the upper and lower panels 12 and 11 are not engaged with each other and are folded in a wave-like configuration. The portions of the upper and lower panels 12 and 11 that are held in place are pressed against the outer circumference of the previously folded part. The gas supplied from the inlet port 15 can be supplied quickly to the peripheral part 14 of the air bag 1, and therefore, the inflation process is improved.

The air bag 1 can be reshaped into a predetermined configuration by performing a shifting step wherein the upper panel 12 is moved closer to the lower panel 11 so that the folded air bag can be accommodated more easily. A portion of the upper panel 12 that is moved overlaps without engaging the portion that is folded during the storing step and pressing step. Therefore, the air bag can inflate quickly and immediately after the inflow of the gas.

The portions of the upper and lower panels 12 and 11 on the lines can be moved apart in the hold alleviating step prior to the completion of the pressing step. Therefore, the air bag 1 can be can be folded easily.

The upper and the lower panels 12 and 11 of the air bag 1 are approximately circular, and the inlet port 15 is arranged approximately at the center of the lower panel 11. Therefore, the structure of the air bag 1 is appropriate for the steering wheel of an automobile.

The exhaust of the gas inside the air bag 1 is regulated in order to ensure a slight amount of gas inside the air bag 1. A slight amount of gas is required for folding the air bag 1. As compared with the structure in which the air bag 1 is inflated, less time is required to supply the gas to and exhaust the gas from the air bag 1. Therefore, components may be omitted or simplified in order to improve productivity.

The method for folding the air bag is performed quickly with a folding device having a simple structure, and the manufacturing costs are decreased. The air bag 1 is reshaped into a desired configuration using the center plate 27 which serves as the shifting means, and the folded air bag 1 can be easily accommodated. The center part of the upper panel 12 which projects from the folded portion of the air bag 1 can be inflated quickly after the gas is supplied to the air bag 1.

In the folding device as shown in FIG. 1, the air bag 1 is held in place by the upper blades 26 serving as the guide member so that the portions of the upper panel 12 and the lower panel 11 are close to each other on the lines directed toward the inlet port 15 at predetermined positions whereas the portions of the upper panel 12 and the lower panel 11 between the lines are not held in place and are partially separated from each other. The portions of the upper panel 12 and the lower panel 11 between the lines are pushed toward the inlet port 15 and are folded so that the portions of the upper panel 12 and the lower panel 11 are not engaged with each other, and each panel is folded in a wave-like configuration to collectively form a folded part. The portions of the upper and the lower panels 12 and 11 on the lines are pushed against the outer circumference of the folded part. Therefore, the gas introduced from the inlet port 15 is supplied effectively to a peripheral part 14 of the air bag 1, so that the air bag 1 inflates efficiently. Furthermore, since the height of the entire surface of the air bag 1 is not held in place at the time of storing the air bag 1, a large member becomes unnecessary for holding the entire surface in place so that the folding device works quickly and has a simple structure, and the manufacturing costs are decreased. Furthermore, the air bag 1 is reshaped in a desired configuration with the center plate 27 serving as shifting means, so that the folded air bag 1 can be accommodated more easily while a portion of the upper panel 12 that is moved overlaps without engaging the folded part of the air bag 1.

The folding device shown in FIG. 14 comprises the first guide parts 25b and 26b and the second guide parts 25c and 26c. In this embodiment, the inflation process is improved since the gas supplied from the inlet port 15 can be transferred easily to the peripheral part 14 of the air bag 1.

The folding device shown in FIG. 18 can comprise a portion of the upper and lower panels 12 and 11 that are separated from each other with gas remaining in the space inside of the air bag 1.

The supporting and lifting means comprises an inflator 41 that serves as a gas generator constituting the air bag device. The inflator 41 can be assembled inside the folded air bag 1, and the inflator 41 can be provided separate from the air bag 1 so that the manufacturing cost of the air bag is reduced.

An inflator 41 provided in the air bag device constitutes the exhaust regulating means for regulating the exhaust of the gas from the air bag 1. When a slight amount of gas is present inside the air bag 1, the air bag 1 can be folded. This modification results in the faster supply and exhaust of gas to the air bag 1 and allows components to be removed or simplified to improve productivity.

The center block 23 of the folding device can comprise pressing means for reshaping the air bag into a desired configuration by pressing the ear parts 33 against the central part 31 of the air bag 1. Therefore, the folded air bag 1 can be accommodated easily into a vessel.

The air bag 1 comprises a lower panel 11 that serves as the surface portion on the one side that includes an inlet port 15 to which the gas is supplied and an upper panel 12 that serves as the surface portion on the other side located opposite to the lower panel 11. The upper and lower panels 12 and 11 are not engaged substantially with each other and are folded in independent wave-like configurations while the ear parts 33 are flattened along a spiral configuration on the folded central part 31 toward the inlet port 15. Since the upper and lower panels 12 and 11 in the ear parts 33 are not engaged with each other, the gas flows smoothly to the end of the ear parts 33 from the inlet port 15 through the peripheral part 14, and the ear parts 33 can be wound back. Therefore, the inflation process is improved.

The portion of the upper panel 12 of the air bag 1 located above the inlet port 15 can be arranged in a single-layered, planar configuration so that the gas supplied from the inlet port 15 can be transferred efficiently to the outer circumference of the central part 31, the wave-shaped fitting parts 32, and the ear parts 33.

The air bag 1 can comprise a front surface developing part on the central portion of the upper panel 12 located above the inlet port 15 of the lower panel 11. The folded air bag 1 is incorporated into an air bag device that operates the inflator, inflates the air bag 1, and breaks the cover body to form a projecting outlet port. The front surface developing part 35 located above the inlet port 15 is inflated swiftly toward the front surface side immediately after the inflow of the gas to break a cover body that covers the folded air bag and inflate the air bag efficiently.

The upper panel 12 of the air bag 1 is not folded with the lower panel 11 so that the gas supplied from the inlet port 15 is transferred efficiently through the air bag 1, thereby improving the inflation process.

What is claimed is:

1. A method for folding an air bag having a lower surface on one side, an inlet port on the lower surface into which gas is introduced, an upper surface on an other side located opposite to the lower surface on the one side, a plurality of radial lines extending in each of a plurality of radial directions from the inlet port, a first lower portion of the lower surface positioned on one of the radial lines, a first upper portion of the upper surface positioned on the radial line, a second lower portion of the lower surface positioned between two of the radial lines, a second upper portion of the upper surface positioned between the two radial lines, a third lower portion of the lower surface positioned around the inlet port, and a third upper portion of the upper surface positioned above the inlet port, said method comprising:

holding the first lower portion and the first upper portion close to each other while supporting the third upper portion with the third lower portion while at least partially lifting the second upper portion from the second lower portion;

pressing the second lower portion and the second upper portion toward the inlet port to form a storage state;

pressing the first lower portion and the first upper portion toward an outer circumference of the second lower portion and the second upper portion of the air bag in the storage state; and shifting the lower surface relative to the upper surface, thereby altering a height of the air bag, after the step of pressing the second lower portion and the second upper portion toward to the inlet port to form the storage state.

2. A method for folding an air bag having a lower surface on one side, an inlet port on the lower surface into which gas is introduced, an upper surface on an other side located opposite to the lower surface on the one side, a plurality of radial lines extending in each of a plurality of radial directions from the inlet port, a first lower portion of the lower surface positioned on one of the radial lines, a first upper portion of the upper surface positioned on the radial line, a second lower portion of the lower surface positioned between two of the radial lines, a second upper portion of the upper surface positioned between the two radial lines, a third lower portion of the lower surface positioned around the inlet port, and a third upper portion of the upper surface positioned above the inlet port, said method comprising:

holding the first lower portion and the first upper portion close to each other while supporting the third upper portion with the third lower portion while at least partially lifting the second upper portion from the second lower portion;

pressing the second lower portion and the second upper portion toward the inlet port to form a storage state;

pressing the first lower portion and the first upper portion toward an outer circumference of the second lower portion and the second upper portion of the air bag in the storage state; and shifting the lower surface relative to the upper surface, thereby altering a height of the air bag, after the pressing step.

3. A method for folding an air bag having a lower surface on one side, an inlet port on the lower surface into which gas is introduced, an upper surface on an other side located opposite to the lower surface on the one side, a plurality of radial lines extending in each of a plurality of radial directions from the inlet port, a first lower portion of the lower surface positioned on one of the radial lines, a first upper portion of the upper surface positioned on the radial line, a second lower portion of the lower surface positioned between two of the radial lines, a second upper portion of the upper surface positioned between the two radial lines, a third lower portion of the lower surface positioned around the inlet port, and a third upper portion of the upper surface positioned above the inlet port, said method comprising:

holding the first lower portion and the first upper portion close to each other while supporting the third upper portion with the third lower portion while at least partially lifting the second upper portion from the second lower portion;

pressing the second lower portion and the second upper portion toward the inlet port to form a storage state; and pressing the first lower portion and the first upper portion toward an outer circumference of the second lower portion and the second upper portion of the air bag in the storage state, wherein the step of pressing the second lower portion and the second upper portion toward to the inlet port to form the storage state comprises the step of regulating the exhaust of the gas inside the air bag to limit the exhaust of the gas.

4. The method for folding the air bag according to claim 3, further comprising the step of alleviating the hold between the first lower portion and first upper portion before the completion of the pressing step after the step of pressing the second lower portion and the second upper portion toward to the inlet port to form the storage state.

5. The method for folding the air bag according to claim 3, wherein the upper surface and the lower surface are approximately circular and the inlet port is arranged on an approximately central part of the lower surface.

6. The method for folding the air bag according to claim 3, wherein the step of regulating the exhaust of the gas inside the air bag comprises the step of maintaining the inlet port in an approximately airtight condition.

7. The method for folding the air bag according to claim 3, wherein the step of regulating the exhaust of the gas inside the air bag comprises the step of preventing air from entering the air bag.

* * * * *

UNITED STATES PATENT AND TRADEMARK OFFICE
CERTIFICATE OF CORRECTION

PATENT NO.         : 6,994,664 B2
APPLICATION NO. : 10/257416
DATED                : February 7, 2006
INVENTOR(S)       : Kazuyoshi Nishijima et al.

It is certified that error appears in the above-identified patent and that said Letters Patent is hereby corrected as shown below:

<u>Title page,</u>
Item [30], Foreign Application Priority Data, insert:
-- April 11, 2000   (JP)................ 2000-109606
   August 31, 2000  (JP) ...............2000-264052 --.

Signed and Sealed this

Twenty-seventh Day of June, 2006

JON W. DUDAS
*Director of the United States Patent and Trademark Office*